US007228320B2

(12) United States Patent
Shitomi et al.

(10) Patent No.: US 7,228,320 B2
(45) Date of Patent: Jun. 5, 2007

(54) SYSTEM AND METHOD FOR CREATING AN OBJECT-LEVEL SNAPSHOT IN A STORAGE SYSTEM

(75) Inventors: Hidehisa Shitomi, Mountain View, CA (US); Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 244 days.

(21) Appl. No.: 10/989,392

(22) Filed: Nov. 17, 2004

(65) Prior Publication Data
US 2006/0106878 A1 May 18, 2006

(51) Int. Cl.
G06F 17/00 (2006.01)
G06F 12/00 (2006.01)
G06F 15/16 (2006.01)

(52) U.S. Cl. .................. 707/204; 707/202; 707/103 R; 709/203

(58) Field of Classification Search ................ 707/204, 707/102, 103 R; 709/203
See application file for complete search history.

(56) References Cited

U.S. PATENT DOCUMENTS

| 5,649,152 | A | 7/1997 | Ohran et al. | |
|---|---|---|---|---|
| 5,761,678 | A | 6/1998 | Bendert et al. | |
| 6,101,497 | A | 8/2000 | Ofek | |
| 6,195,661 | B1 * | 2/2001 | Filepp et al. ............... | 707/102 |
| 6,298,401 | B1 | 10/2001 | Anderson | |
| 6,704,838 | B2 * | 3/2004 | Anderson ................... | 711/114 |
| 6,804,690 | B1 | 10/2004 | Dysert et al. | |
| 2002/0129047 | A1 * | 9/2002 | Cane et al. ................. | 707/204 |
| 2003/0101189 | A1 * | 5/2003 | Lanzatella et al. .......... | 707/100 |
| 2003/0115439 | A1 * | 6/2003 | Mahalingam et al. .......... | 712/1 |
| 2004/0220964 | A1 * | 11/2004 | Shiftan et al. .......... | 707/103 R |

OTHER PUBLICATIONS

VERITAS NetBackup™ DataCenter 4.5, System Administrator's Guide for UNIX, Mar. 2002, VERITAS.*
Zeng et al.: SOSS: Smart Object-Based Storage System, Proc. of the Third International Conf. on Machine Learning and Cybernetics, Shanghai, Aug. 26-29, 2004.*
Wang et al.: OBFS: A File System for Object-Based Storage Devices, Proc. of the 21st IEEE Conf. on Mass Storage Systems and Technologies, College Park, MD, Apr. 2004.*

(Continued)

Primary Examiner—John Cottingham
Assistant Examiner—Kuen S. Lu
(74) Attorney, Agent, or Firm—Mattingly, Stanger, Malur & Brundidge, P.C.

(57) ABSTRACT

A system and method for object-level snapshot creation in an object-based storage system. The host device includes a first object management table (OMT) and a file system. The object-based storage system is connected to the host device and includes a controller and object-based storage devices (OSD). The controller includes a snapshot module, a second OMT. The snapshot module receives and processes OSD and other commands from the file system or a service processor, creates an original object and a mirror object in an OSD, and initiates a snapshot operation in an OSD. The first OMT may also reside at a metadata server. A snapshot operation may be a mirror operation or a copy on write operation. The first OMT and the second OMT maintain mapping information of a file identifier, a partition ID, and an object ID, and an object status and a generation number of snapshots.

32 Claims, 20 Drawing Sheets

OTHER PUBLICATIONS

Du et al.: Experiences Building an Object-Based Storage System based on the OSD T-10 Standard, DTC Intelligent Storage Consortium, University of Minesota.*

"ANSI T-10 Working Draft: Information Technology—SCSI Object-Based Storage Device Commands (OSD)", Feb. 19, 2004.

* cited by examiner

Fig. 5

| OSD OPERATION/COMMAND |
|---|
| •CREATE(IN PID, IN/OUT OID, IN numObj, IN attrs) |
| •WRITE(IN PID, IN OID, IN length, IN startByte, IN data) |
| •READ(IN PID, IN OID, IN length, IN startByte, OUT data) |
| •GET ATTRIBUTE(IN PID, IN OID, OUT attrs) |
| •SET ATTRIBUTE(IN PID, IN OID, IN attrs) |
| •CREATE AND WRITE(IN PID, IN/OUT OID, IN numObj, IN attrs, IN startByte, IN data) |

SYSTEM AND METHOD FOR CREATING AN OBJECT-LEVEL SNAPSHOT IN A STORAGE SYSTEM

BACKGROUND

1. Field of the Invention

This invention relates to storage systems, and more specifically to creating an object-level snapshot in a storage system.

2. Description of the Related Art

A storage device (e.g., magnetic disks) typically stores data on a block basis. However, an object-based storage device (OSD) stores data as an object. In an OSD, each object includes the data and an attribute portion. The attributes may include information regarding, for example, the size of the data, user ID information, etc. Since the attribute maintains the size of data in the object, the object size may be variable. In contrast, in current storage devices such as hard disk drives (HDDs) the size of the stored information is typically fixed.

Current snapshot mechanisms are based on block level addressing on a storage system. A file system on a host computer can translate a file name into an appropriate block address. However, objects in an object-based storage device are identified by their object ID (OID), therefore, a snapshot copy on an object-based storage system may require the host computer to manage the relationship between file names and snapshot object OIDs. Further, currently an OSD does not have a copy operation interface. Therefore, when a snapshot copy is provided on an object-based storage system, a new command, or some module that takes care of the snapshot creation operation, needs to be provided in the storage system.

Therefore, there is a need to provide a snapshot copy on an object-based storage system.

SUMMARY OF THE INVENTION

A system and method for object-level snapshot creation in an object-based storage system that includes a host device and an object-based storage system. The host device includes a first object management table (OMT) and a file system. The object-based storage system is connected to the host device and includes a controller and one or more object-based storage devices (OSD). The controller includes a snapshot module, a second OMT, and a service delivery subsystem. The snapshot module is capable of receiving and processing OSD commands, split commands, and proprietary commands from the file system or a service processor, creating an original object and a mirror object in an OSD, and initiating a snapshot operation in an OSD. The first OSD may also reside at a metadata server. A snapshot operation may be a mirror operation or a copy on write operation. The first OMT and the second OMT maintain mapping information of a file identifier (FID), a partition ID (PID), and an object ID (OID), and an object status and a generation number of snapshots, the object status being one of mirror or split. The present invention may also be applied to primary and differential volumes.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 5 is a list of some OSD operations/commands according to an example embodiment of the present invention;

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the present invention relate to a system and method for creating a snapshot copy of an object in a storage system. In accordance with users' instruction, the storage system creates a point-in-time image of the specified object (snapshot object) within the storage system. The snapshot object may be the physical copy of the specified object, or may be a virtual object that is created by the storage controller. Since the storage system assigns a different object ID to the snapshot object, the user can distinguish the specified object from the snapshot object. Embodiments of the present invention will be illustrated following by making reference to a storage system being an object-based storage system, however, the present invention may be applied to any storage system that includes object based storage devices. Further, both OBSD and OSD may be used to refer to an object based storage device.

Figure 1:
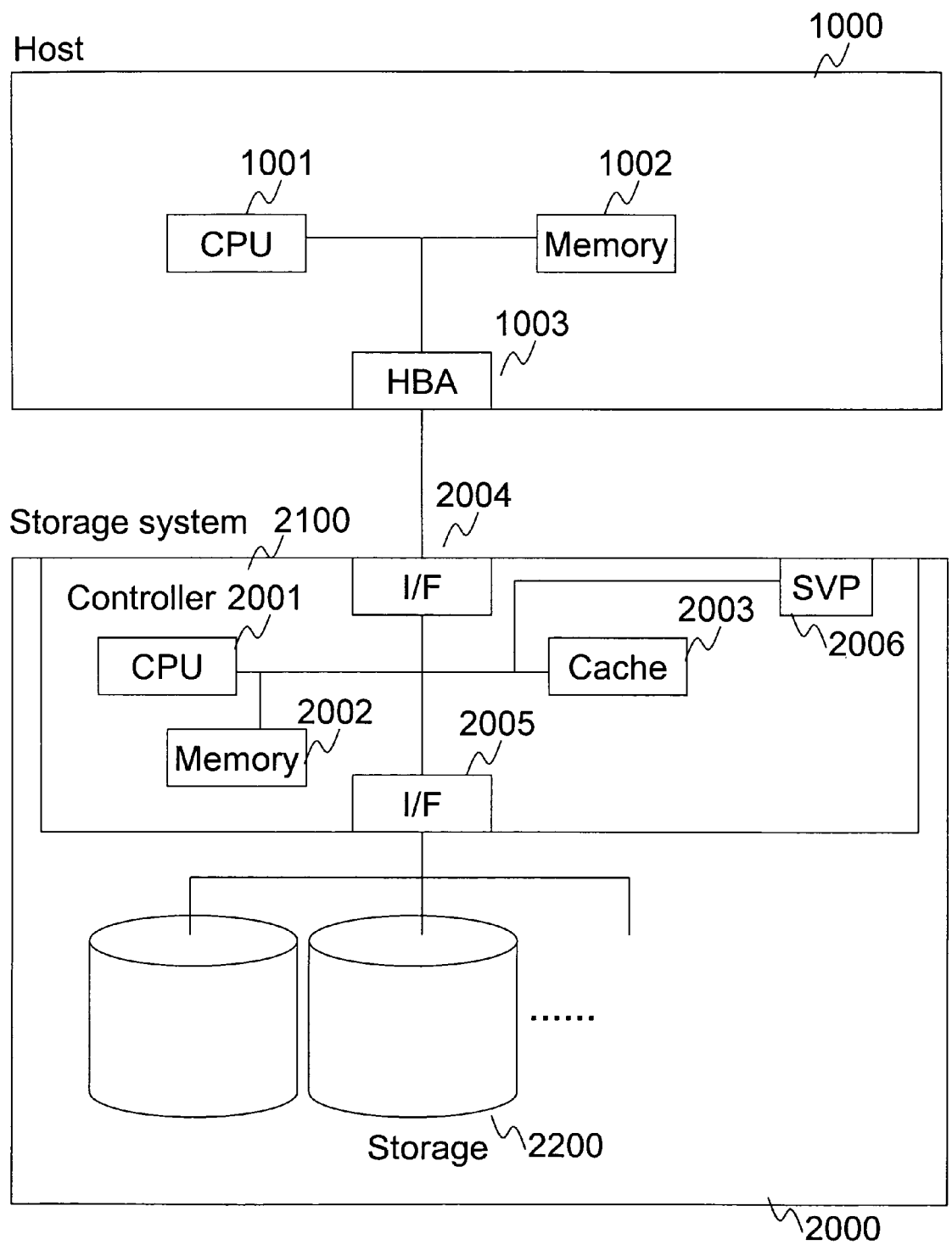
FIG. 1 is a diagram of a system for providing a snapshot copy on an object-based storage system according to an example embodiment of the present invention.

FIG. 1 shows a diagram of a system for providing a snapshot copy on an object-based storage system according to an example embodiment of the present invention. The system may include a host computer 1000 operatively connected to a storage system 2000 via a host bus adapter (HBA) 1003 at the host computer 1000 and a host interface 2004 at storage system 2000. The host computer 1000 may include a CPU 1001, a memory 1002, and a host bus adapter 1003. The storage system 2000 may include a disk controller 2100 that includes a CPU 2001, a memory 2002, a cache memory 2003, the host interface 2004, a disk interface 2005, and a service processor (SVP) 2006, and one or more storage devices 2200. One or more of the storage devices 2200 may be an object-based storage device. The devices within the disk controller 2100 may all be interconnected via an internal bus. The disk controller 2100 processes input/output (I/O) requests from the host computer 1000. The I/O request is based on the object-based storage device commands.

The interface between the host computer 1000 and the storage system 2000 may be a fibre channel (FC), Ethernet, etc. The disk interface 2005 is used to connect the storage devices 2200 and the disk controller 2100. The service processor 2006 may be operatively connected to the storage system 2000, and used to set/change the configuration of the storage system 2000. Each of the storage devices 2200 processes the I/O requests in accordance with object-based storage device commands.

The memory 2002 may be used to store programs to process I/O requests or other operations. The CPU 2001 executes the programs stored in the memory 2002. The cache memory 2003 may store the write data from the host computer 1000 temporarily before the data is stored into the storage devices 2200, and may also store the read data that is requested by the host computer 1000. The cache memory 2003 may be a battery backed-up non-volatile memory. Further, the memory 2002 and the cache memory 2003 may be combined to be within the same memory and still be within the scope of the present invention.

Figure 2:
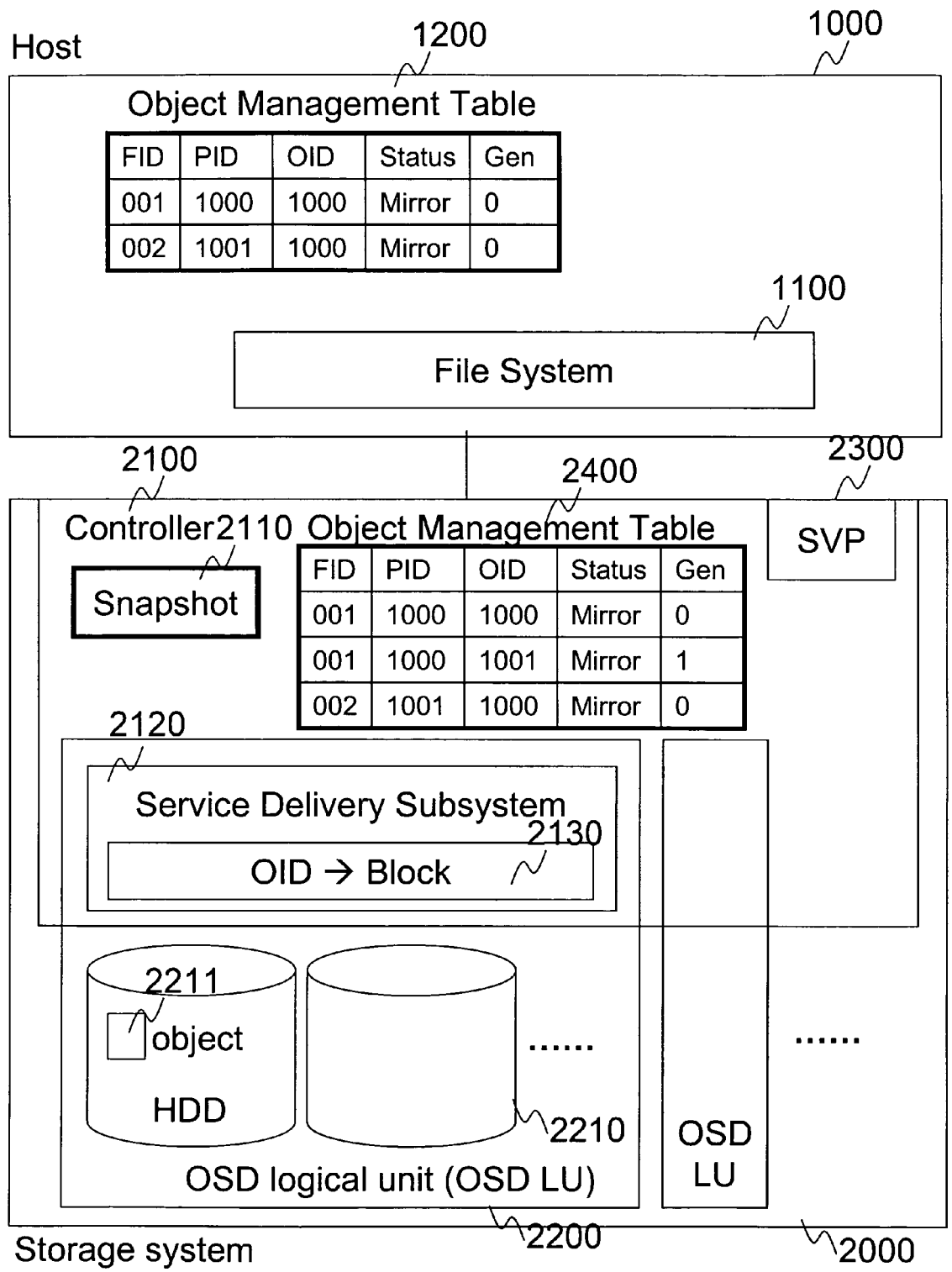
FIG. 2 is a diagram of software configurations in a system according to an example embodiment of the present invention.

FIG. 2 shows a diagram of software configurations in a system according to an example embodiment of the present invention. The host 1000 may be a server computer of a client-server system, a mainframe computer or any other type computer that generates I/O operations to a storage system 2000. The host 1000 may include a file system 1100, and an object management table 1200. The file system 1100 may receive file I/O operations from applications (not shown), manage file attributes and object attributes, and issue OSD commands to the object-based storage system 2000. The object management table 1200 may maintain mapping information of a file identifier (FID) such as a file name, a partition ID (PID), and an object ID (OID) as well as a status of the object (e.g., mirror or split), and a generation number of snapshots.

The storage system 2000 may include a disk controller 2100 and a number of OSD logical units (OSD LU) 2200. The disk controller 2100 may include software to receive and process OSD commands from a host 1000, such as, for example, a snapshot module. The snapshot module 2110 may be a software module executable at the disk controller and creates a snapshot (point in time copy) of objects. The disk controller 2100 may also include an Object Management Table 2400 that is similar to the Object Management Table 1200 on the host device 1000. The Object Management Table 2400 manages the PID and OID for objects. In one embodiment of the present invention, the mirroring snapshot mechanism may be used. However, embodiments of the present invention may also implement a copy on write snapshot mechanism. A host 1000 or a SVP 2300 may invoke a snapshot mechanism or process by issuing a command to the snapshot module 2110. An SVP 2300 may be a computer used by an administrator to set/change configurations of a storage system 2000. The OSD LU 2200 may be composed of a service delivery subsystem 2120, and one or more hard disk drives 2210. Further, there may be one or more OSD LUs in a storage system 2000.

A service delivery subsystem 2120 may be a software program that handles dispatching OSD commands to hard disk drives 2210. The service delivery subsystem 2120 may reside on a disk controller 2100. When a translation mechanism 2130 that translates an OID to a physical block number of a disk resides in the disk controller 2100, a device to store objects may be a regular hard disk drive (HDD) 2210, which stores data in blocks (see FIG. 3A). However, when the translation mechanism 2130 is in the HDD, the HDD can be called an object-based storage device (OBSD) 2410, and can receive OSD commands directly (see FIG. 3B). Objects that may exist in the HDD 2210 or OBSD 2410 will be explained in more details following. Further, according to embodiments of the present invention, objects may be associated with a file, a volume, a table, or other components, as will be explained in further detail following.

Figures 3A, 3B:
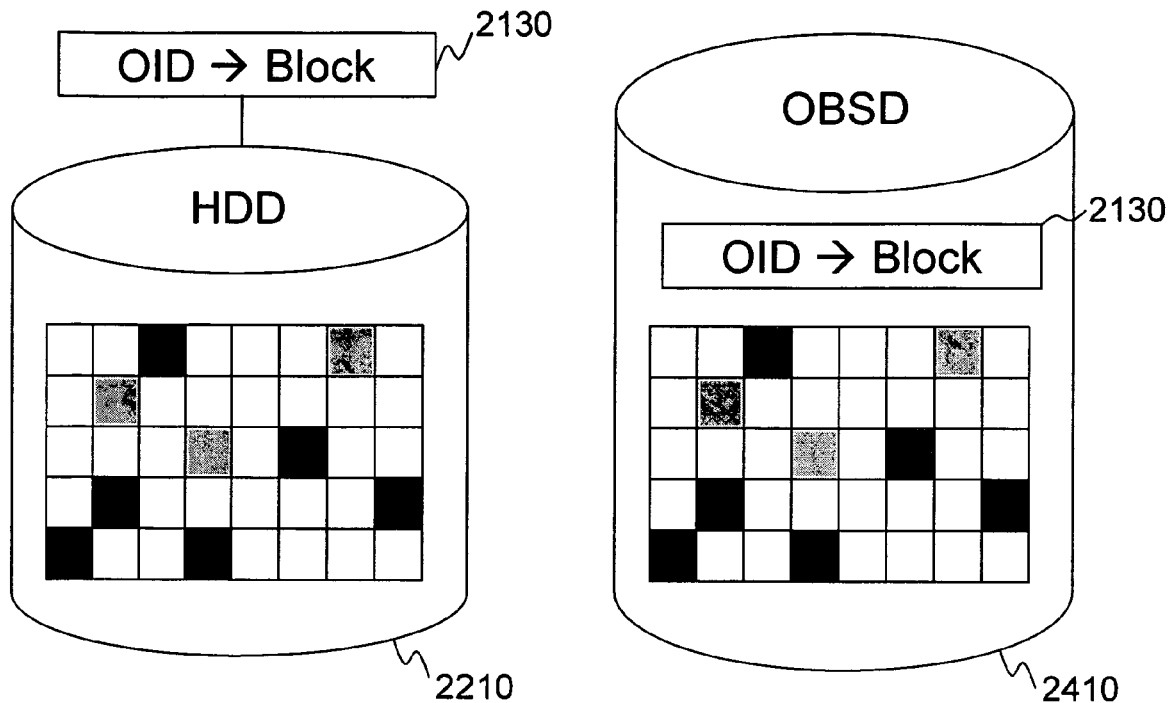
FIGS. 3A–3C illustrate examples of a HDD, an OBSD and partitions, respectively, according to an example embodiment of the present invention.
Figure 3C:
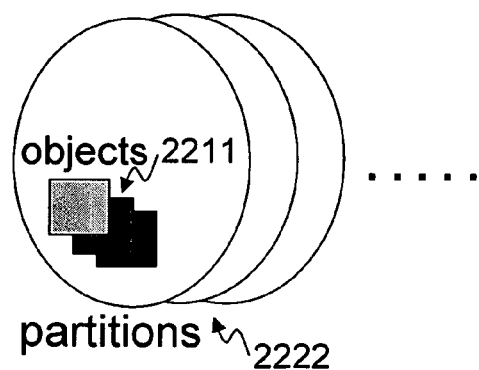

FIGS. 3A–3B illustrate examples of a HDD 2210 and OBSD 2410, respectively, according to an example embodiment of the present invention. As illustrated in FIG. 3C, there may be one or more partitions 2222 in a HDD 2210 or OBSD 2410. Moreover, these devices may include one or more objects 2211 within a partition 2222. In a partition 2222, objects 2211 can share attributes. As noted previously, one difference between a HDD 2210 and an OBSD 2410 depends on whether the address translation mechanism 2130 exists in the device or not. In the embodiments that follow, HDDs 2210 may be mostly used as the storage device to illustrate the present invention. However, an OBSD 2410 may also be used for the storage device in each of these embodiments.

Figure 4:
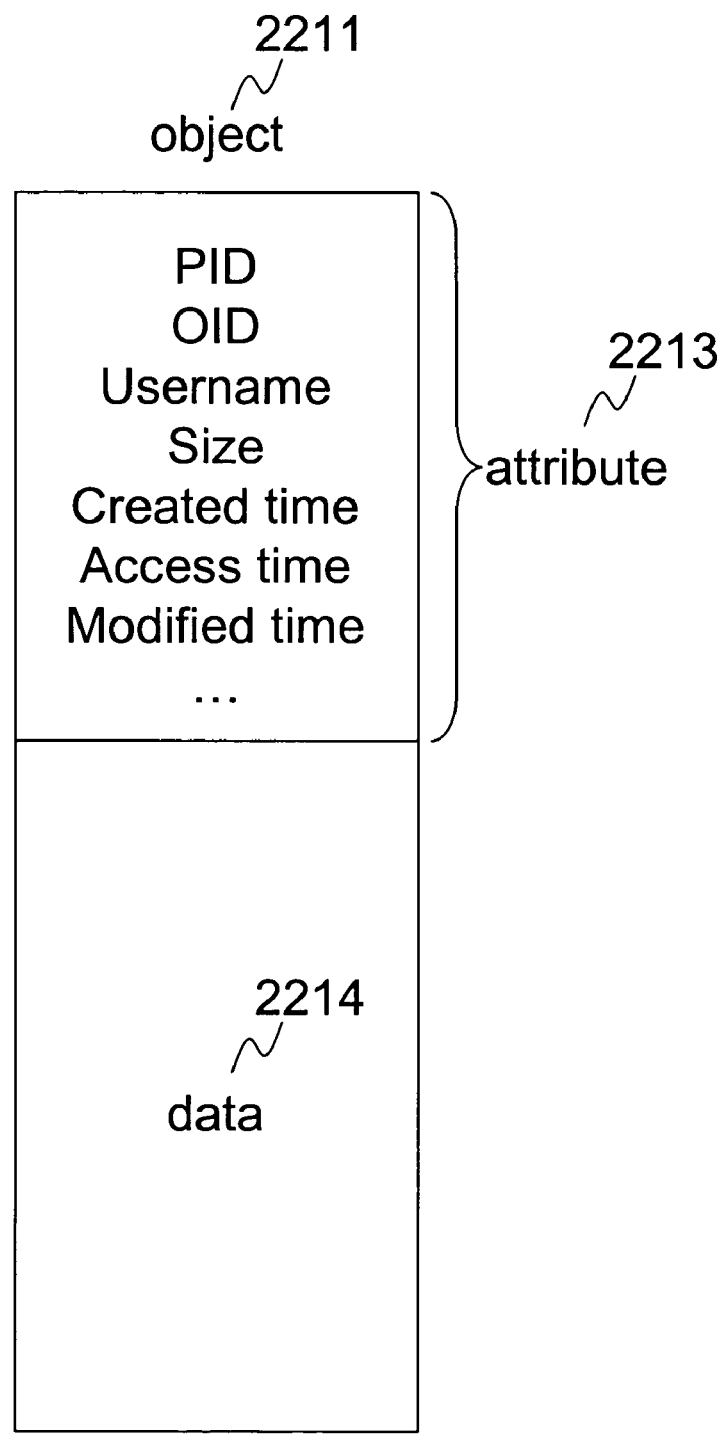
FIG. 4 is a diagram of an object according to an example embodiment of the present invention.

FIG. 4 shows a diagram of an object according to an example embodiment of the present invention. As noted previously, a storage system 2000 processes I/O requests from a host computer 1000 in accordance with the object-based storage device commands (OSD command). In the OSD command system, the host computer 1000 reads/writes data from/to the storage system 2000 as an object. The object includes the "data" 2214 and an "attribute" (or metadata) 2213. The attribute 2213 may contain identification information of the object, for example, file ID (FID). Since the size of an object may be variable, each object may include the size of the object in each attribute. A storage system 2000 may maintain any type of attribute information such as, for example, partition ID (PID), object ID (OID) that is the identification number of each object, user name that identifies the user name of the object, used capacity that shows the size of the object (including attribute), created time that is the time that the object was created, attribute accessed time that is the last time that the attribute was accessed, attribute modified time that is the last time the attribute was modified, data accessed time that is the last time the data was accessed, and data modified time that is the last time the data was modified. The user object ID may also be referred to as object ID (OID). Some attribute information has already been defined in standardization organizations, but vendors may also define additional attribute information in their OSDs. Moreover, although there may be existing OSD commands, vendors may define unique parameters used in these existing OSD commands, or may define proprietary OSD commands based on specific OSD implementations.

FIG. 5 shows a list of some OSD operations/commands according to an example embodiment of the present invention. These operations/commands include, for example, CREATE, WRITE, READ, SET ATTRIBUTE, GET ATTRIBUTE, and CREATE AND WRITE. The CREATE command is used to allocate one or more objects in the OSD. The WRITE command includes parameters related to the object ID, starting byte address, and length. This command is used for writing a certain length of data from the specified starting byte address and the object specified with the object ID. Further, the attribute can be changed at the same time when invoking the command. The READ command includes parameters related to the object ID, starting byte address, and length. This command is used for reading a certain length of data from the specified starting byte address and the object specified with the object ID. Further, the object can be changed at the same time when invoking the command. The SET ATTRIBUTE command may be used to change an attribute of an object specified in a parameter. The GET ATTRIBUTE command may be used to retrieve an attribute of an object specified in a parameter from an object-based storage device. The CREATE AND WRITE command is a combination operation of a create operation and write operation and is used to execute create and write operations in a single command.

Figure 6:
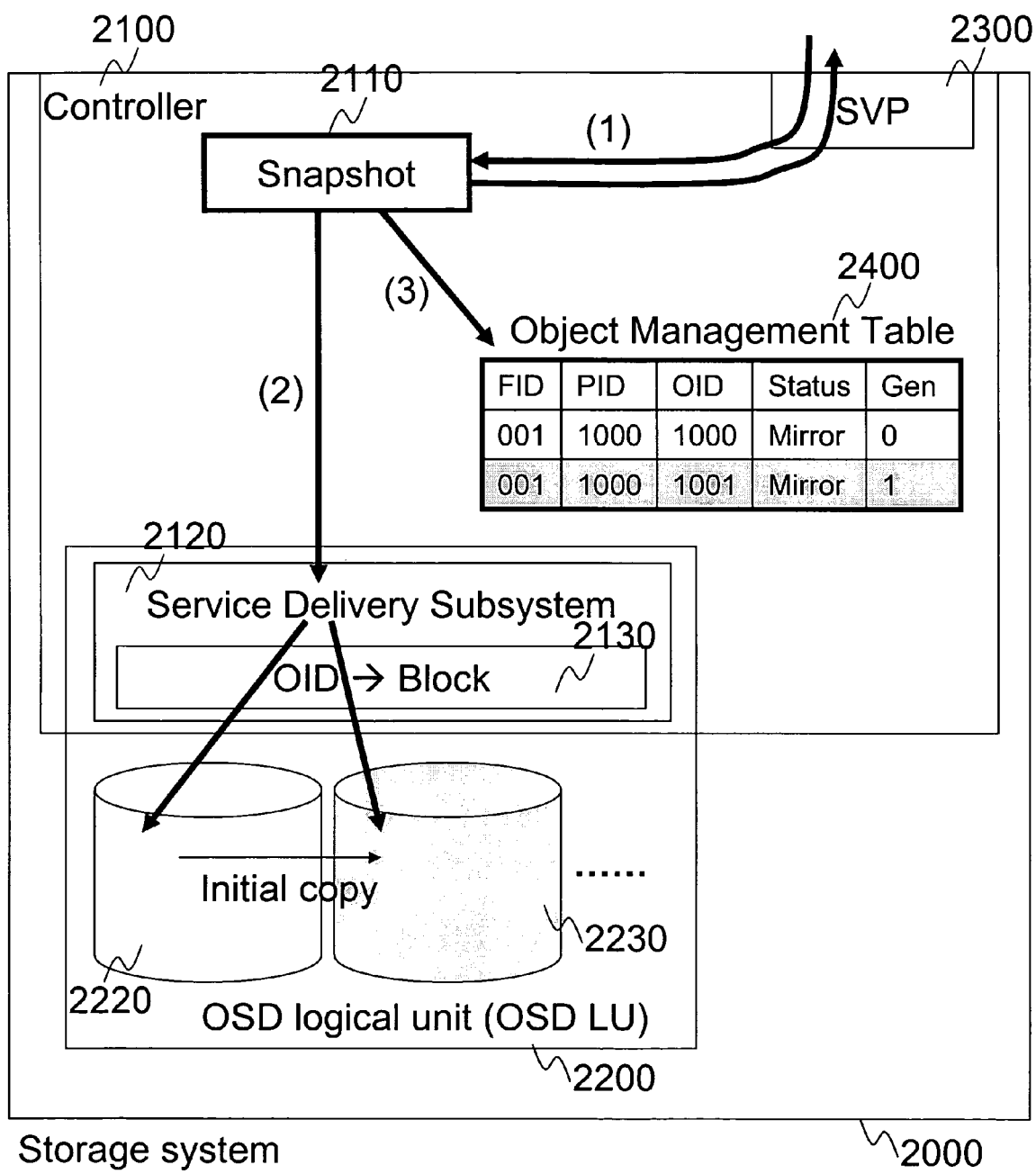
FIG. 6 is a diagram of a pair-create procedure according to an example embodiment of the present invention.

FIG. 6 shows a diagram of a pair create procedure according to an example embodiment of the present invention. Preceding a snapshot operation using mirroring, a PAIR CREATE operation is issued from an application on a host device or on a client machine of the host. The PAIR CREATE operation may also be initiated from the SVP 2300. The PAIR CREATE operation first copies a source volume to a destination volume (initial copy), and starts mirroring. Since currently there is no copy command in the OSD command set, according to the present application, the initial copy may be performed by a process as described in FIG. 15.

As shown in FIG. 6, in a PAIR CREATE according to the present invention, an administrator issues the PAIR CREATE command designating a source volume through the SVP 2300 (1). It is possible to designate a destination volume as well. If the destination volume is not designated, the snapshot module may decide a destination volume. The snapshot module 2110 on the disk controller 2100 receives the PAIR CREATE command and starts an initial copy from the source volume 2220 to the destination volume 2230 (2).

In this process, objects in the source volume are copied one by one to other objects in the destination volume. During the initial copy process, the copied objects may be created in the destination volume. When the copied object is created, a new PID and OID are assigned to the copied object (3). The PID and OID of the copied object are stored in an Object Management Table 2400 with the same FID as the source object. The status column of both original (source) and destination (copied) objects becomes "mirror". The generation number may be managed by the snapshot module, and assigned to the destination object. For the source object, the number may be 0, for example, which means it is not a snapshot object. In another embodiment, the generation number of a mirror object can be determined when the snapshot module looks at the object management table 2400 and finds the largest generation number for the file. As mentioned before, the PAIR CREATE command can come from the host side instead of the SVP. The file creation and file write operation to the mirrored volume will be discussed following. The mirror is taken of an object unit, which thus far has been a file, instead of the whole volume.

Figure 7:
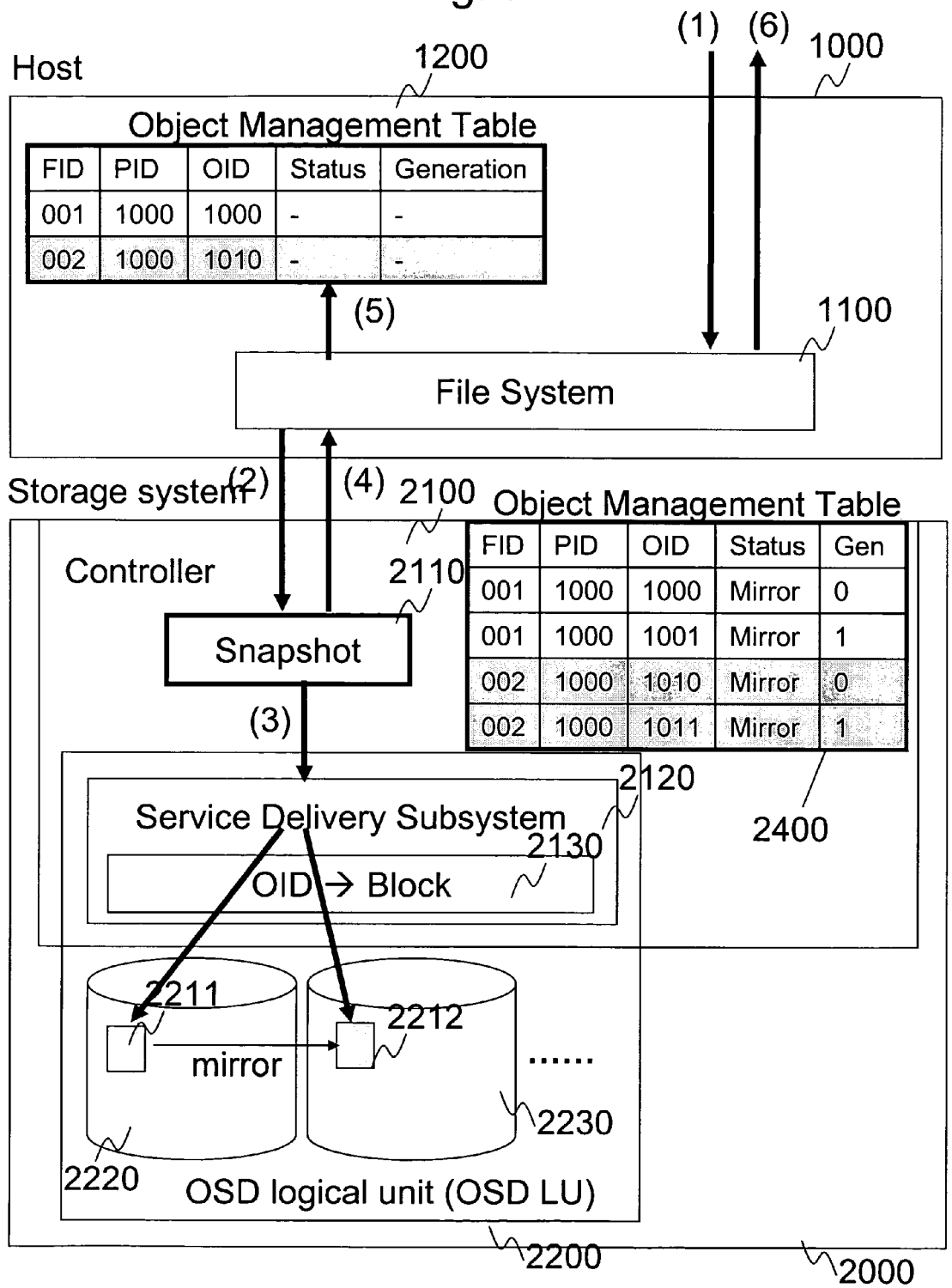
FIG. 7 is a system diagram illustrating an object creation to a mirrored volume on an object-based storage system according to an example embodiment of the present invention.

FIG. 7 shows a system diagram illustrating an object creation to a mirrored volume on an object-based storage system according to an example embodiment of the present invention. An application on a host 1000 or on a client computer of a host creates a file through a file system API designating a file identifier such as a file name (1). A file system 1100 creates attributes that may not exist in an OSD object 2211 and stores them in a storage device on a host 1000 or on a storage system 2000 as an object by using a CREATE AND WRITE command. The file system manages the creation of partitions and, therefore, the file system knows in which partition a new object for a file should be created and sets the partition ID (PID) in the CREATE AND WRITE command to specify the partition for a new object. Then, the file system issues the CREATE AND WRITE command to create an object for the file (2). When the file system issues the CREATE AND WRITE command, it can assign an OID for the file as well as the PID. If the file system sets 0, for example, for an OID field of the CREATE AND WRITE command, an OSD will assign the OID number.

A snapshot module 2110 on a disk controller 2100 traps the CREATE AND WRITE command and creates both an object, which the application requests to create (original object), and a copy of the object (mirror object) by processing the CREATE AND WRITE command (3). A service delivery subsystem 2120 receives and implements the CREATE AND WRITE command. An original object 2211 is created in some unused area of a source volume 2220 at the designated PID and OID. If the designated OID is 0, the OSD LU 2200 sets an OID. A mirror object 2212 of the original object 2211 is also created in some unused area of the destination volume 2230. The mirroring process may be transparent to the file system, thus, the file system may not know that the original object is mirrored. The snapshot module 2110 may assign the PID and the OID for the mirror object 2212. The snapshot module 2110 returns the OID for the original object 2211 to the file system 1100 (4). Since the file system 1100 already knows the PID for the original object, only an OID for the original object may be sent. A file system 1100 registers an FID, an original PID, and an original OID, into an object management table 1200 along with a generation number for the file, which may be 0, for example, for the original object (5). The object management table 1200 can be stored in a storage device on a host or on a storage system as an object. A file system 1100 may return a result of file creation operation to an application (6).

Figure 8:
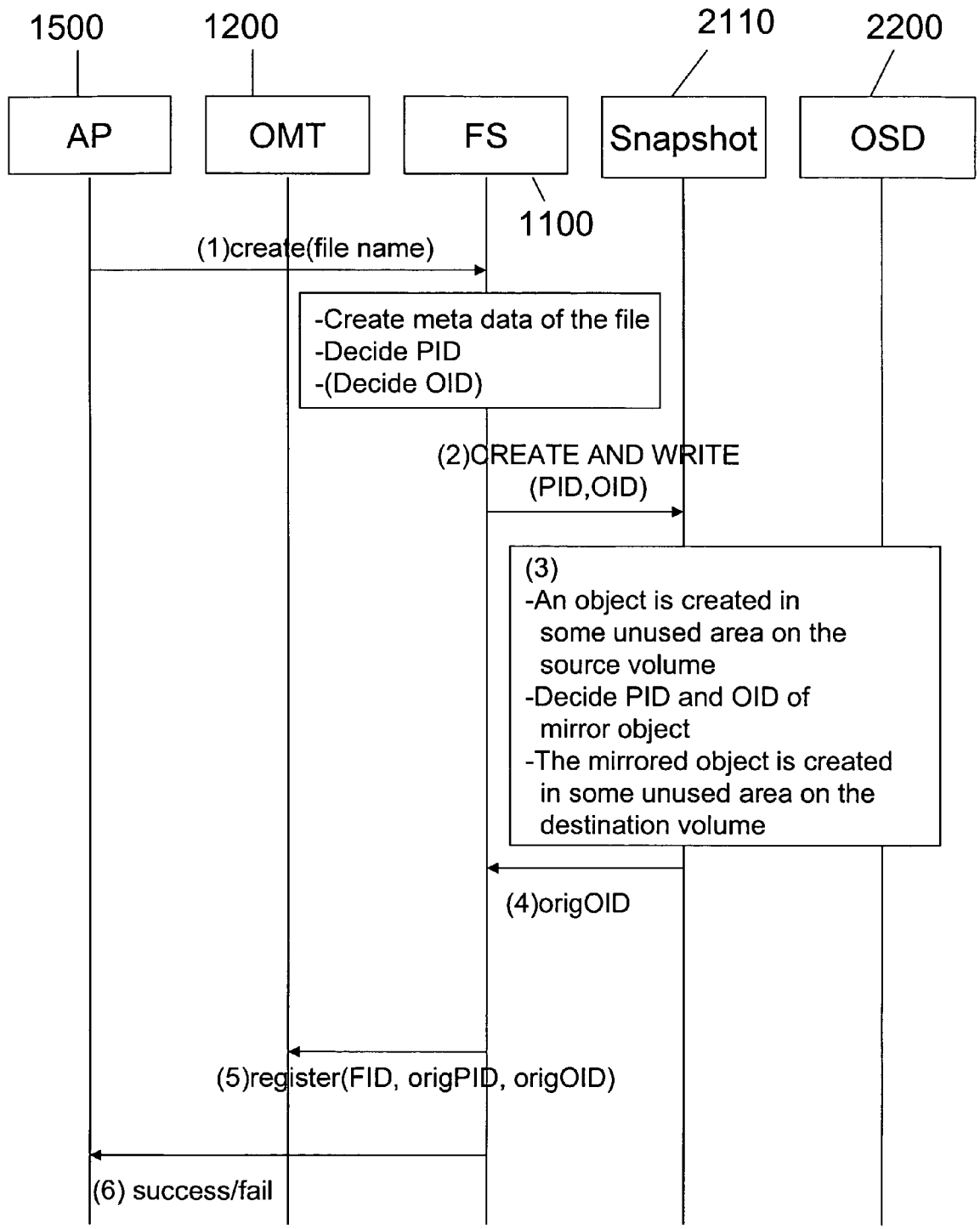
FIG. 8 is a sequence diagram of an object creation according to the example embodiment in FIG. 7 of the present invention. An object is kept mirroring until getting a split request.

FIG. 8 shows a sequence diagram of an object creation according to the example embodiment in FIG. 7 of the present invention. This process has been explained during the discussion of FIG. 7. The sequence diagram highlights the parameters passed between devices/entities involved in an object creation process as well as activities performed at each device/entity.

Figure 9:
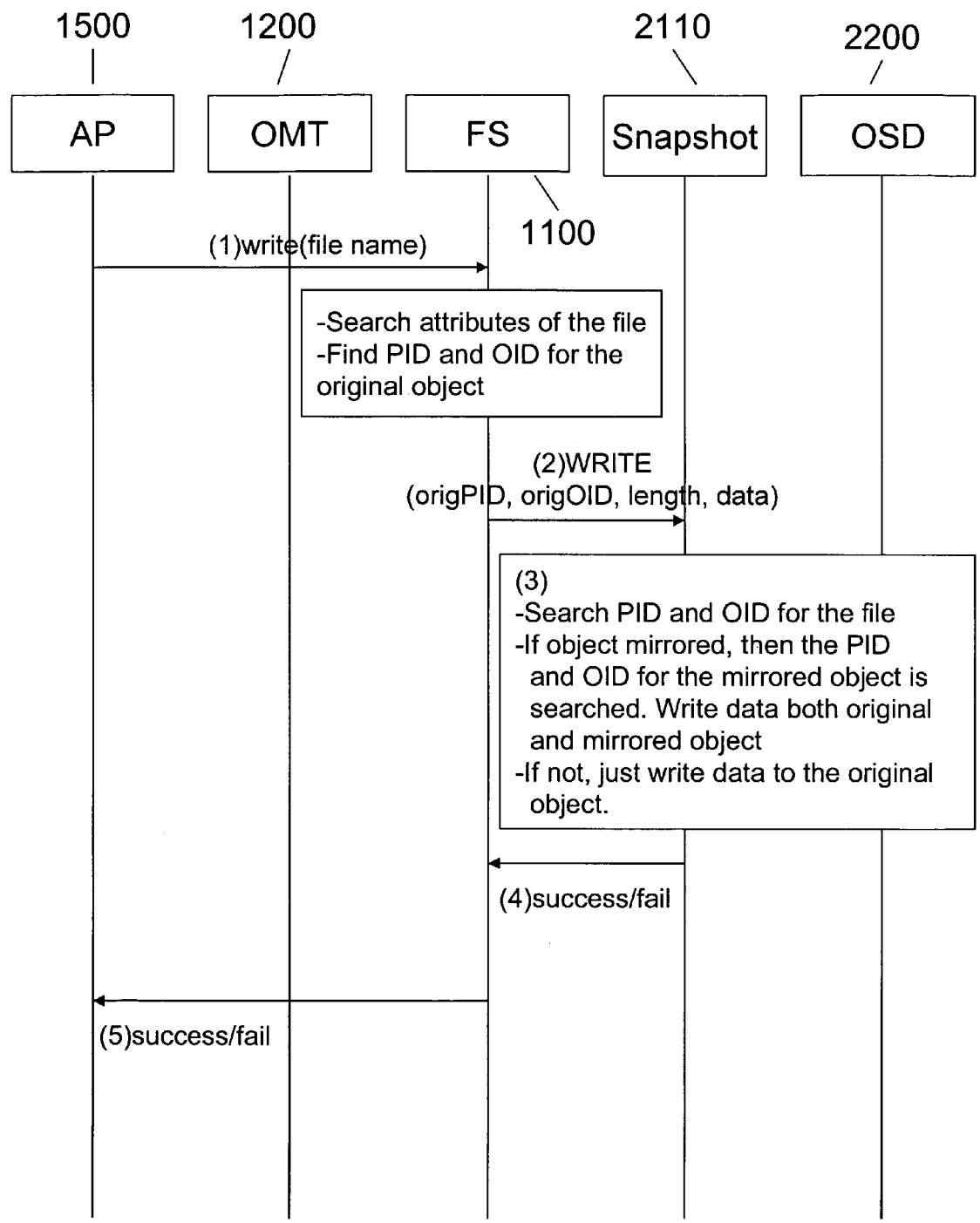
FIG. 9 is a sequence diagram of a data write operation according to an example embodiment of the present invention.

FIG. 9 shows a sequence diagram of data write operation according to an example embodiment of the present invention. Parameter passing among an application 1500 on a client computer or a host, a file system 1100, a snapshot module 2110, an object storage device 2200, and an object management table is shown 1200. Although parameters are shown here for illustration, the present invention is not limited to these parameters as other parameters may exist and still be within the scope of the present invention.

An object may be kept mirroring until getting a split request. The data write process is similar to the file creation process described previously. An application 1500 on a host 1000 or on a client computer of a host writes data on a file through a file system API designating a file identifier such as a file name, data length, and data (1). A file system 1100 searches attributes (e.g., in an i-node table of UNIX systems), and finds a FID for the file. The file system searches the PID and OID for the original file in an object management table 1200. If the file identifier delivered from the application 1500 is exactly the same as the FID that may be obtained from the object management table 1200, the search of the attributes (e.g., in an i-node table) is not needed. The file system issues a WRITE command to write data to the object for the file with the parameters of an original PID, an original OID, a data length, and data (2). A snapshot module 2110 on the disk controller 2100 traps the WRITE command. The snapshot module 2110 then searches an Object Management Table 2400 (not shown in this figure) at the storage system for a FID for the object using the designated original PID and OID. If the object is mirrored, then the mirrored object, which has the same FID as the original object and may have the largest generation number in the Object Management Table 2400, is searched. The snapshot module writes the data onto both the original object and the mirror object by using the WRITE command (3). The snapshot module 2110 returns a result of the operation, e.g. a success or fail, to the file system 1100 (4). Unlike the file creation process, there may be no need to register any information in the object management table 1200. A file system 1100 returns a result of file creation operation to an application (5). If the status of an original file in the Object Management Table 2400 is SPLIT, the data is just written onto the original object.

Figure 10:
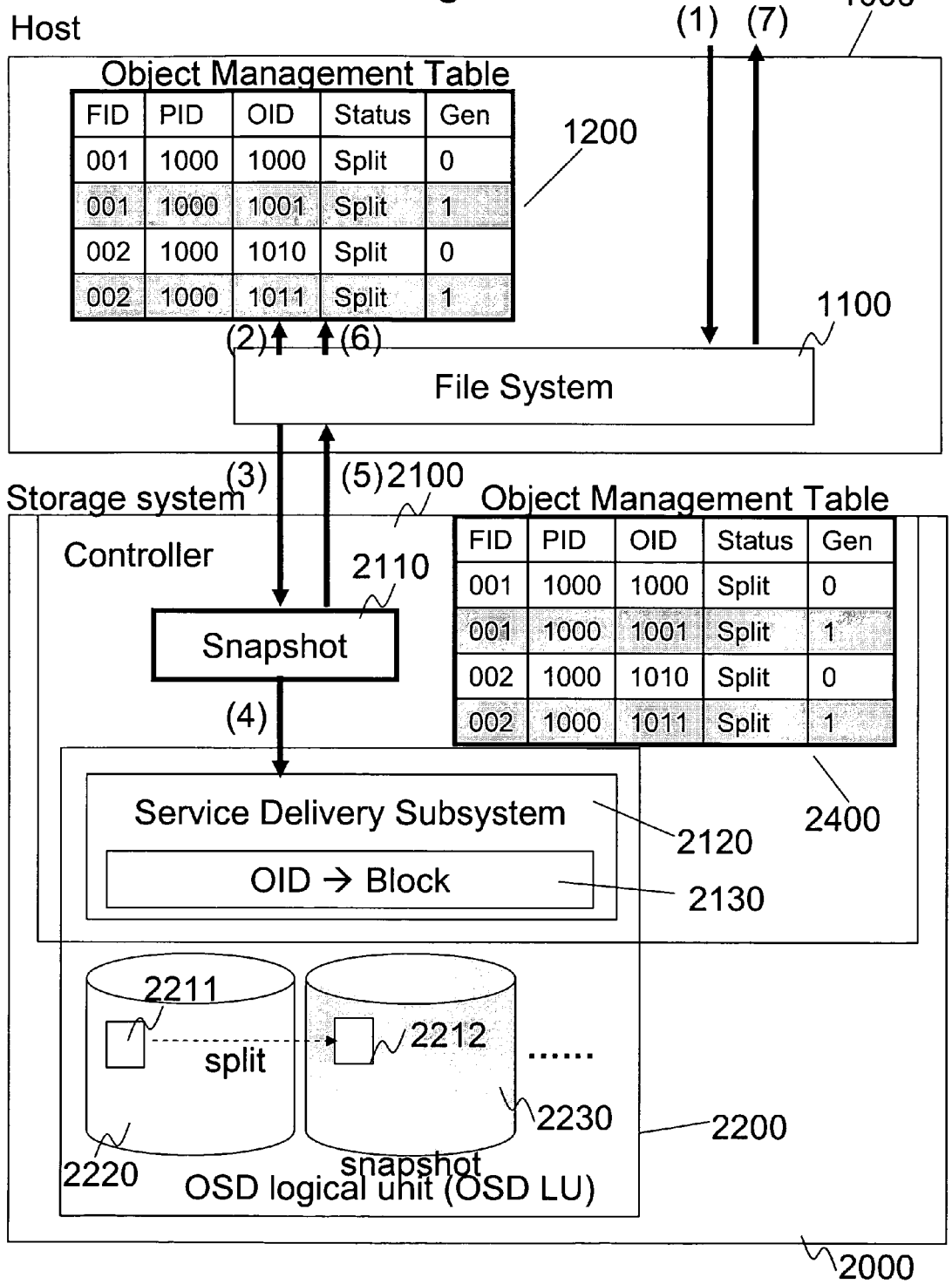
FIG. 10 is a diagram of a snapshot creation operation on an object-based storage system according to an example embodiment of the present invention.

FIG. 10 shows a diagram of a snapshot creation operation on an object-based storage system according to an example embodiment of the present invention. A split operation from a user or an administrator initiates the snapshot creation operation. An application on a host 1000 or on a client computer of a host requests a snapshot creation, which means issues a split command, with a file identifier or source volume name (1). The split command can be applied to an object unit or a volume unit. A file system 1100 searches attributes (e.g., an i-node of UNIX systems), and finds a FID for the file. The file system searches for the PID and OID for the original file in an object management table 1200 using the FID (2). If the file identifier that is delivered from the application is exactly the same as the FID in the object management table, the search may not be needed. Further, if a volume name is designated, the volume name only may be sent to the snapshot module. The volume name may reside in the object management table 2400.

The file system 1100 can invoke the snapshot module 2110 using a new OSD command such as SPLIT or some other existing OSD command with vendor attributes. Moreover, a proprietary command between the file system 1100 and the snapshot module 2110 may be used. The file system 1100 invokes the snapshot module 2110 in the disk controller 2100 with the parameters of an original PID, an original OID, or a volume name (3). After receiving the split request, the snapshot module 2110 changes its configuration to stop mirroring (4). The status in the object management table 2400 for both the original object and the mirrored object is modified to be SPLIT. If the split command is applied to the whole volume, the status of other objects in the volume is also modified to be SPLIT. Objects on the same volume can be managed by the disk controller. The snapshot module sends back both the original OID and PID and mirrored OID, PID and a generation number to the file system 1100 object by object (5). The file system registers the PID, OID, and generation number for the mirrored objects, and changes the status of both the original object and mirror object into SPLIT in the object management table 1200 (6). A file system 1100 may return a result of snapshot operation to the application (7).

Figure 11:
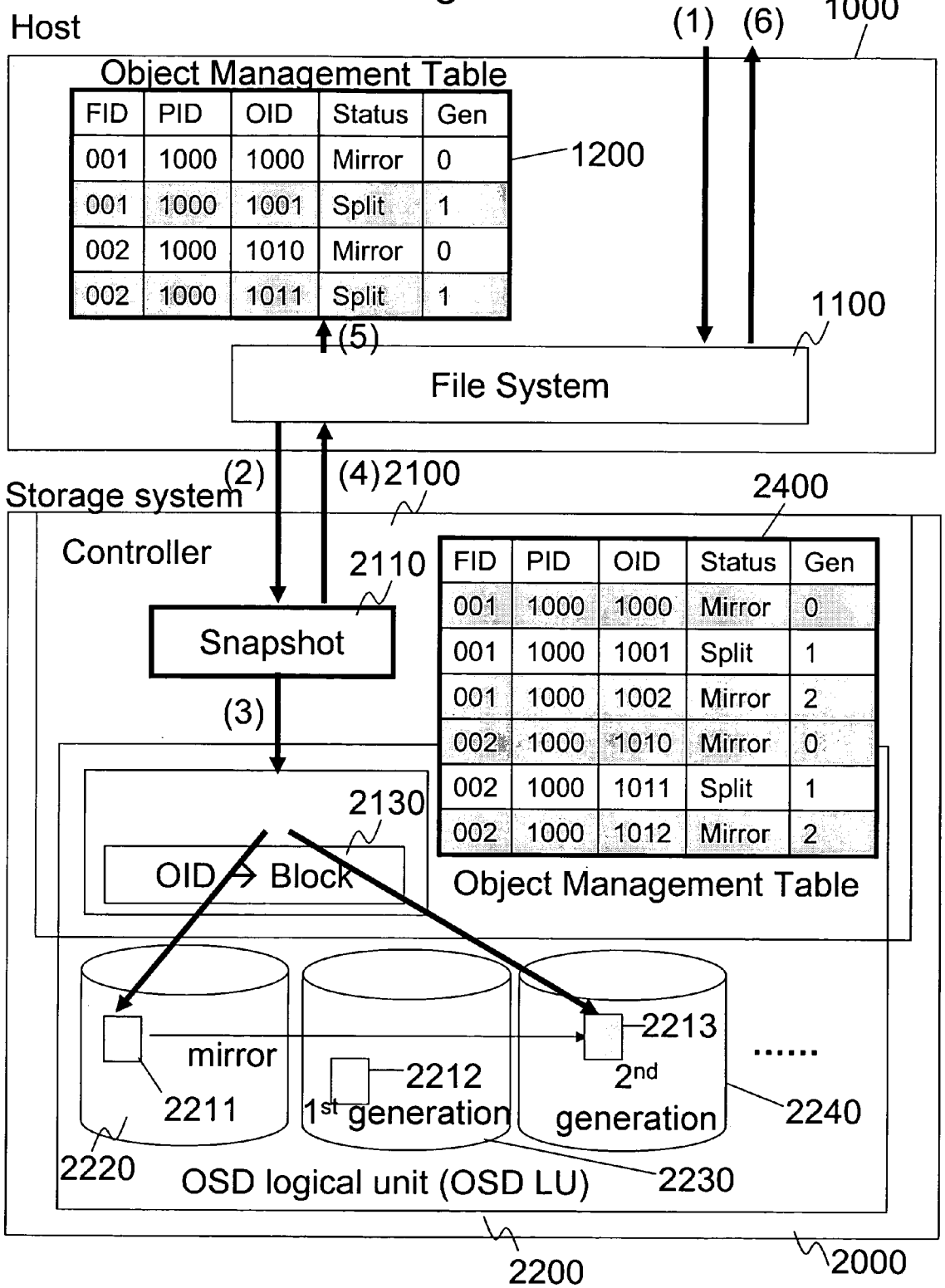
FIG. 11 is a diagram of a mirror process after a split according to an example embodiment of the present application.

FIG. 11 shows a diagram of a mirror process after a split according to an example embodiment of the present application. It has been assumed previously that the mirror of an original file ends after the split command. However, it is possible to keep mirroring after a split command. In this case, the snapshot module 2210 creates the copy 2213 of the original object 2211 onto another volume 2240 (initial copy) in the process (2) and (3) shown in FIG. 6. A new destination volume may be assigned by the snapshot module 2210. The snapshot module 2110 updates the object management table 2400. Hereafter, a write operation to the original volume may be mirrored to the new destination volume 2240. If the users or administrators issue a stop mirroring command, a new destination volume is not created any more. Moreover, according to the present invention, there is another way to keep mirroring. When a PAIR CREATE command is invoked, it is possible to create multiple mirror volumes such as 2230 and 2240. Each time the SPLIT command is issued, one of the mirrored volumes such as 2230 can be split.

Figure 12:
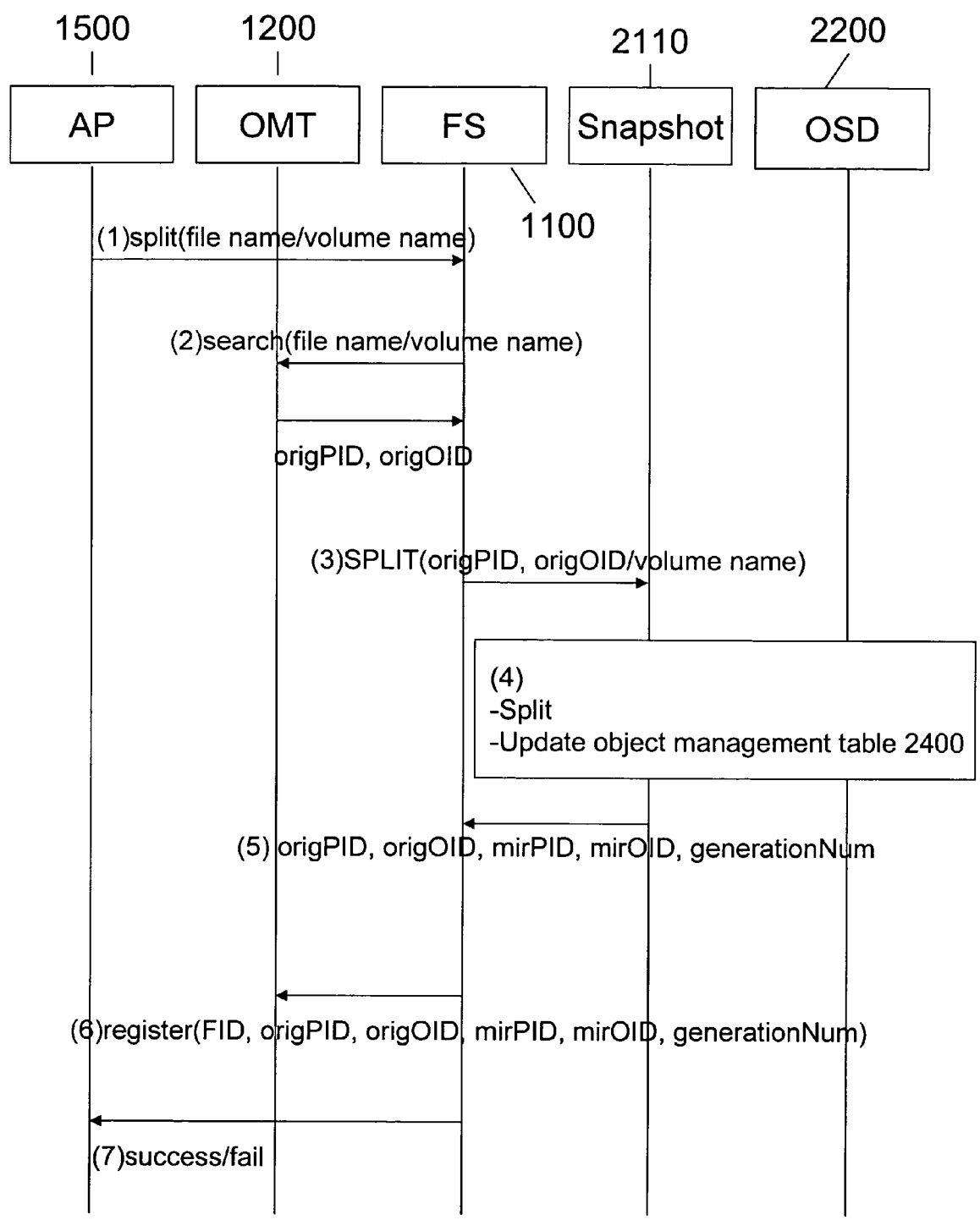
FIG. 12 is a sequence diagram of a snapshot creation operation according to an example embodiment of the present invention

FIG. 12 shows a sequence diagram of a snapshot creation operation according to an example embodiment of the present invention. Parameter passing among an application on a client computer or a host, a file system, a snapshot module, an object based storage device, and an object management table is shown. The present invention is not limited to just the parameters shown in this figure as there may be more parameters in each passing. The numbers in a parenthesis relate to activities associated with the same numbers shown in FIG. 10.

Figure 13:
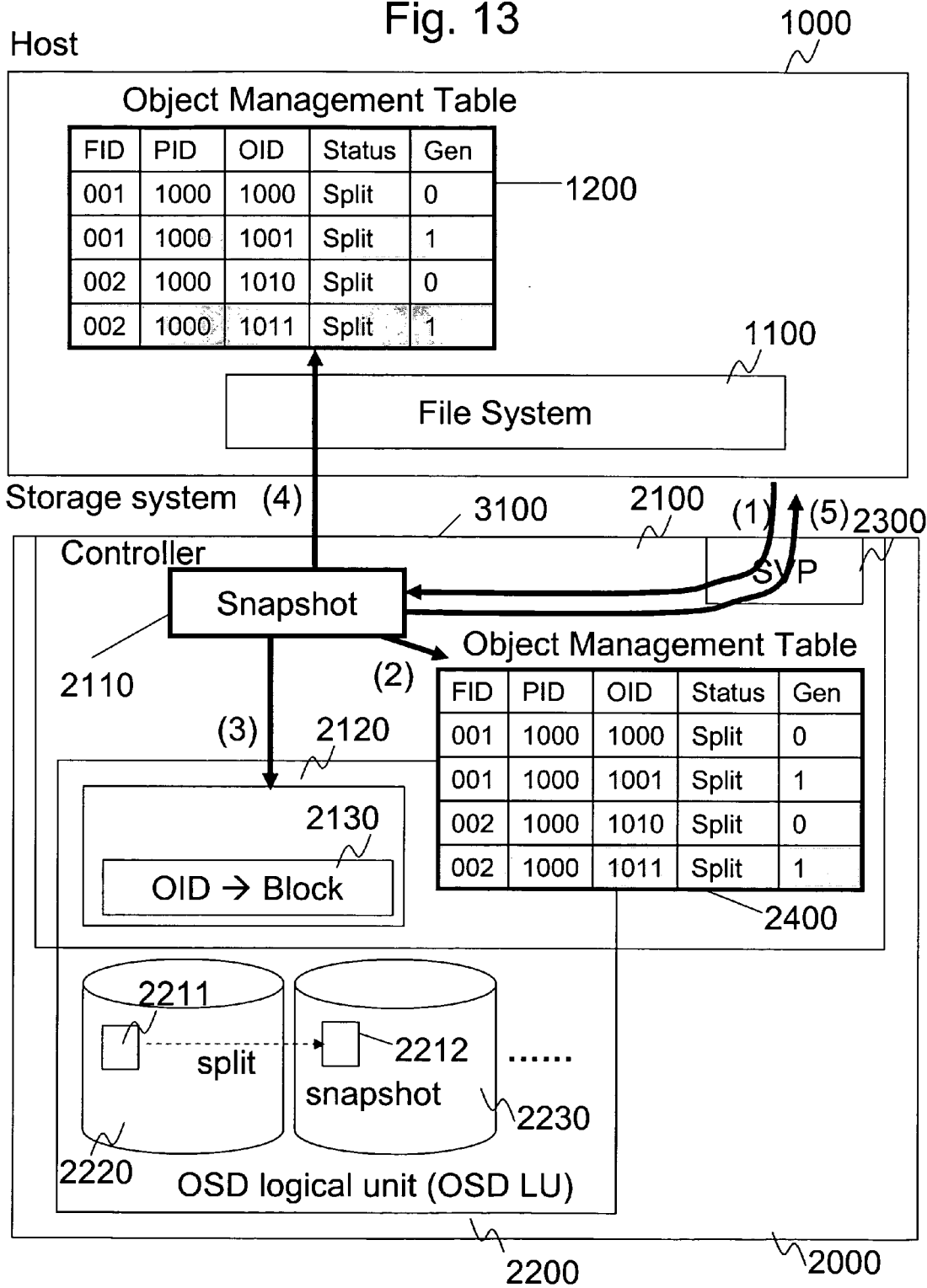
FIG. 13 is a diagram of invocation of a snapshot operation through an SVP according to an example embodiment of the present invention.

FIG. 13 shows a diagram of invocation of a snapshot operation through an SVP according to an example embodiment of the present invention. An administrator of a storage system 2000 can request a pair create or split operation through an SVP 2300. In this embodiment, a PID and an OID of an original object or a source volume name are designated in the operation, instead of a file identifier. A PID and an OID for a mirror object can also be designated by an administrator at the SVP 2300 (1). The SVP 2300 invokes a snapshot module 2110 with the PID and OID of the original object or the source volume name. The SVP 2300 may also invoke the snapshot module 2110 using a new OSD command such as SPLIT or some existing OSD command with vendor attributes. Moreover, a proprietary command between the SVP 2300 and the snapshot module 2110 can be used. Regardless of method, the SVP 2300 invokes the snapshot module 2110 in the disk controller 2100 with the parameters of original PID and original OID.

If the snapshot module 2110 receives a split request and the PID and OID for the mirror object are not designated, the snapshot module may search for the PID and OID of the mirror object in the object management table 2400 using the original PID and OID for the search (2). The snapshot module 2110 changes its configuration to stop mirroring. A status in the object management table 2400 for both original object 2211 and mirrored object 2212 is modified to be SPLIT. If the split command is applied to the whole volume, the other objects in the volume may be set to be a status of SPLIT. Objects on the same volume may be managed by the disk controller 2100. The snapshot module 2110 sends back both an original OID and PID and mirrored OID and PID, and a generation number to the file system 1100 (3). The snapshot module 2110 asks the file system 1100 to register the PID, OID and generation number for the mirror object 2212, and change the status of the original object 2211 and mirror object 2212 into SPLIT in the object management table 1200 (4). The snapshot module 2110 may return a result of file creation operation to the SVP 2300 (5).

Figure 14:
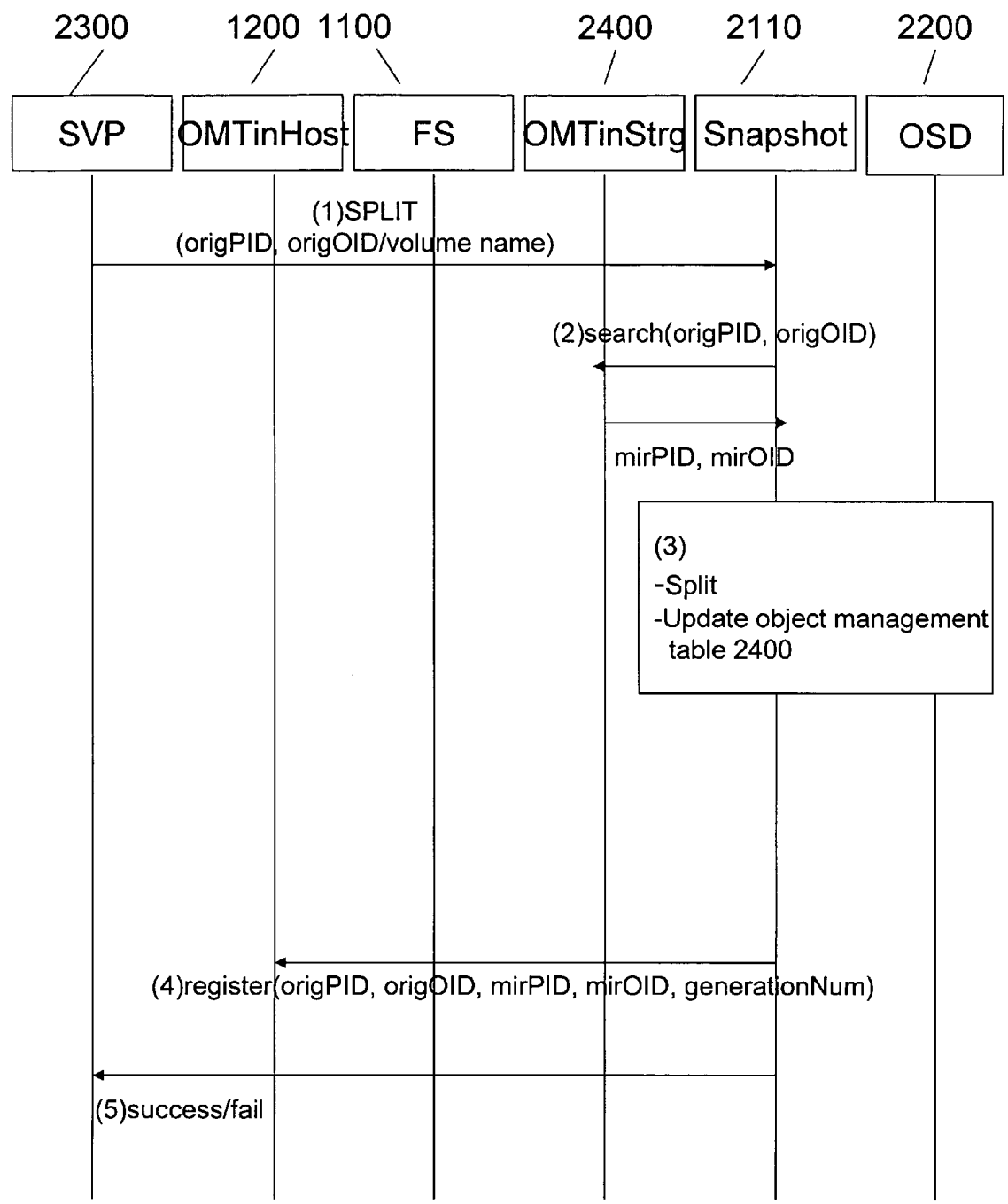
FIG. 14 is a sequence diagram of a snapshot creation operation through an SVP according to an example embodiment of the present invention.

FIG. 14 shows a sequence diagram of a snapshot creation operation through an SVP according to an example embodiment of the present invention. This figure illustrates parameter passing among an SVP 2300, an object management table in a host 1200, a file system 1100, an object management table in a storage system 2400, a snapshot module 2110, and an object storage device 2200. Although some parameters are shown in this figure for illustration, the present invention is not limited by these parameters as more and other parameters may exist and still be within the scope of the present invention. The activity represented by the number in parentheses is associated with the activity for the same number shown and discussed previously regarding FIG. 13.

A SVP 2300 may send a split command to a snapshot module 2110 that includes an original PID, and an original OID/volume name (1). The snapshot module 2110 may initiate a search in an object management table 2400 at the storage system at a storage system using the original PID and original OID (2). The snapshot module 2100 may retrieve a mirror PID and a mirror OID from the object management table 2400 at the storage system. The snapshot module 2110 may then send a split command to the object storage device 2200. The snapshot module 2110 and object storage device 2200 may then process the split command and update the object management table 2400 at the storage system (3). The snapshot module 2110 may then send a register command to the object management table 1200 in the host device that includes an original PID, an original OID, a mirror PID, a mirror OID and a generation number (4). The snapshot module 2110 may also send a success/fail status to the SVP 2300 (5).

Figure 15:
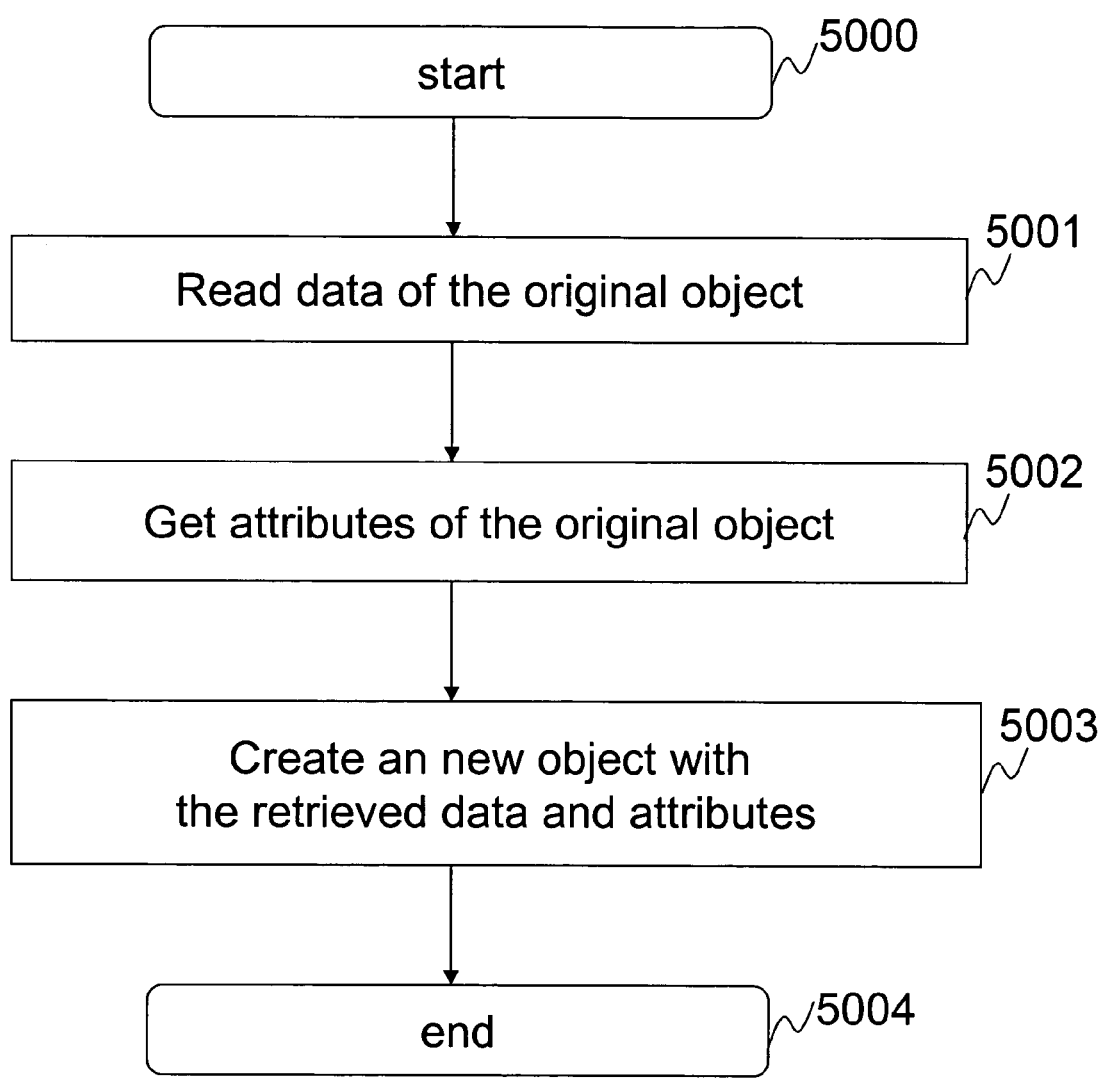
FIG. 15 is a flowchart of a copy operation according to an example embodiment of the present invention.

FIG. 15 shows a flowchart of a copy operation according to an example embodiment of the present invention. This figure illustrates how the snapshot module creates the copy of the object from a source volume to a destination volume when the snapshot module 2110 receives a create/write request from the host computer 1000 or is invoked through an SVP. The process may be executed on the CPU 2001 of controller 2100. The snapshot module knows a PID and an OID of the original object when the process is invoked. The snapshot module invokes a READ command and reads data of an original object designated to be copied, 5001. The snapshot module invokes a GET ATTRIBUTE command and gets attributes of the original object, 5002. The snapshot module invokes a CREATE AND WRITE command with the data and attributes obtained in Step 5001 and 5002, and the PID and OID that is designated for the snapshot module by the file system or snapshot module itself, 5003. The process then ends, 5004.

Figure 16:
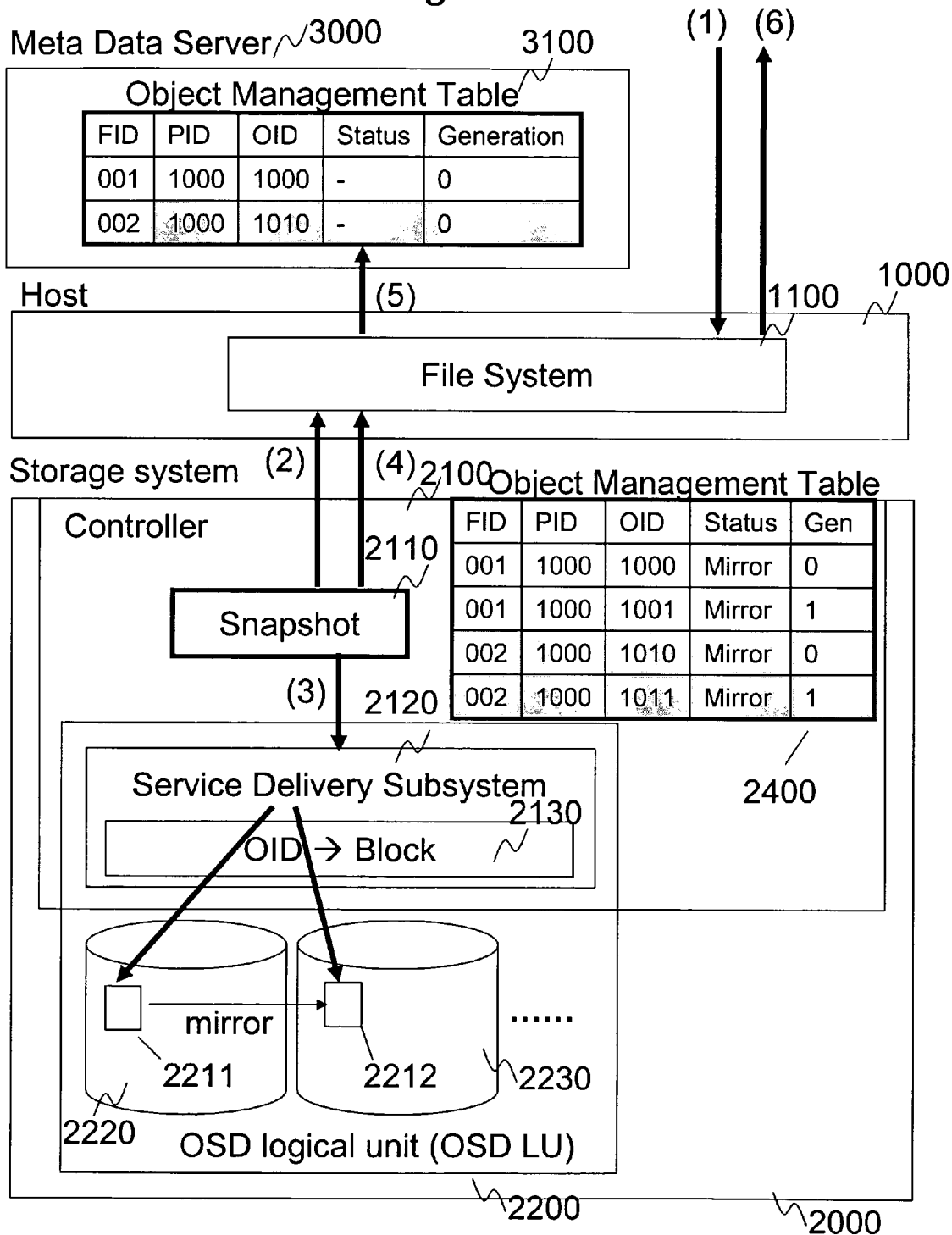
FIG. 16 is a diagram of an object creation operation on an object-based storage system with a metadata server according to an example embodiment of the present invention.

FIG. 16 shows a diagram of an object creation operation on an object-based storage system with a metadata server according to an example embodiment of the present invention. According to the present invention, an object management table 3100 can be maintained by a metadata server 3000 operatively connected to a host device 1000. This figure is the same as FIG. 7 except that a file system 1100 registers a PID and an OID of the created object into an object management table 3100 residing at a metadata server 3000. The object creation process may be the same as the previous embodiment discussed and illustrated regarding FIG. 7.

Figure 17:
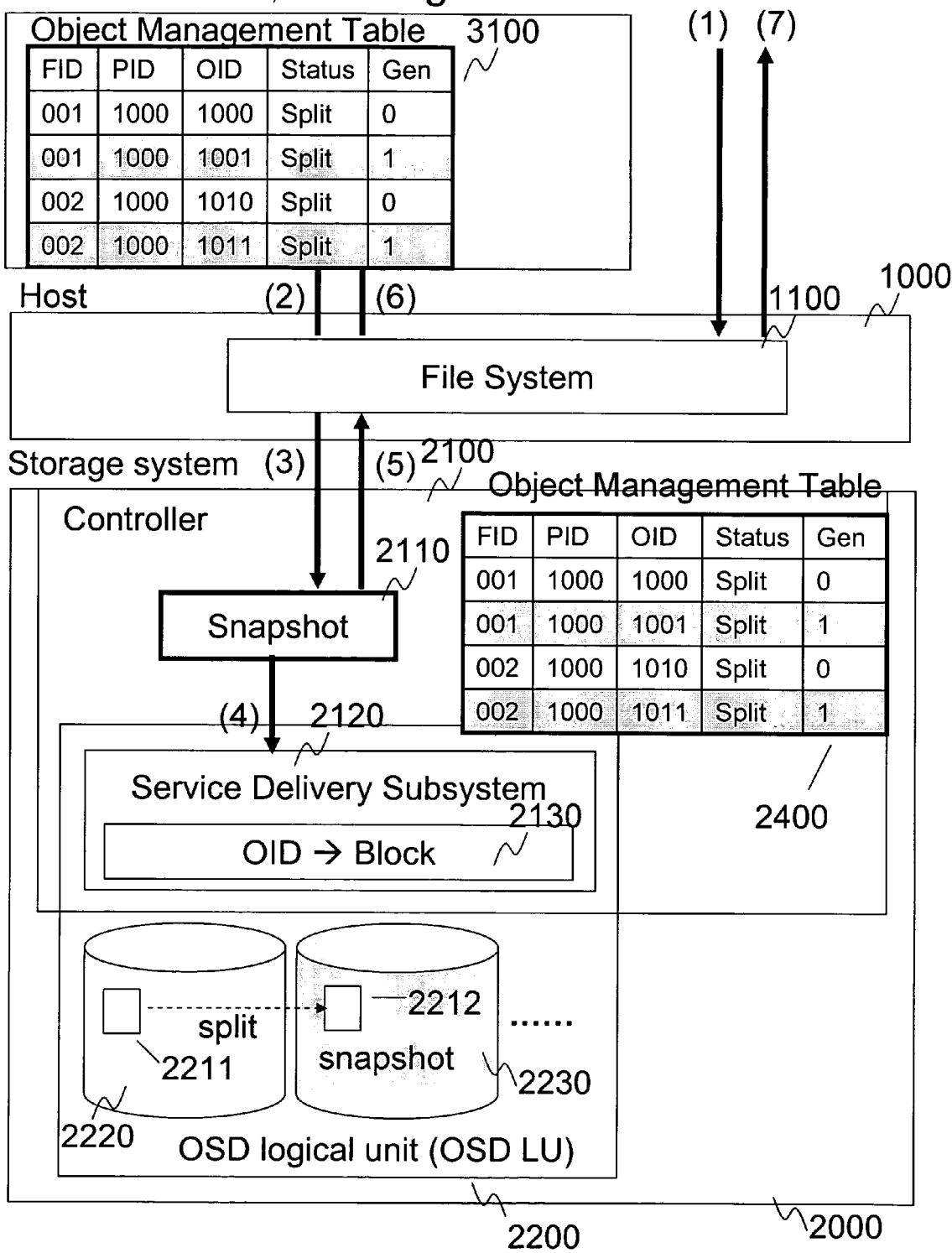
FIG. 17 is a diagram of a snapshot creation process on an object-based storage system with a metadata server according to an example embodiment of the present invention.

FIG. 17 shows a diagram of a snapshot creation process on an object-based storage system with a metadata server according to an example embodiment of the present invention. This figure is the same as that shown in FIG. 10 except that here, a file system 1100 registers a PID, an OID, and handles generation of the snapshot object into an object management table 3100 residing at a metadata server 3000. Similar to FIG. 13, the snapshot request can be come from a SVP 2300. The snapshot creation process may be the same as the previous embodiment discussed and illustrated regarding FIG. 10.

In previous embodiments, it as assumed that a file associates with an object. However, multiple files may be associated with an object, or a file may be associated with multiple files, according to the present invention. Moreover, from the viewpoint of a database, a table may be associated with an object, or a row or a column may be associated with an object. In previous embodiments that have been discussed thus far, the snapshot mechanism used in a storage system may be based on a mirror and split. However, according to the present invention, there can be another snapshot mechanism in a storage system based on a copy on write operation.

After a snapshot creation command to some volume (e.g., primary volume) is issued by an application on the host or a client machine, or by an administrator through a SVP, each time the write operation to the primary volume occurs, the updated data is stored in another volume, e.g., a differential volume. The new data is written in the primary volume. Compared with the mirroring, there is no need of an initial copy, and the updated data is stored in the differential volume.

Figure 18:
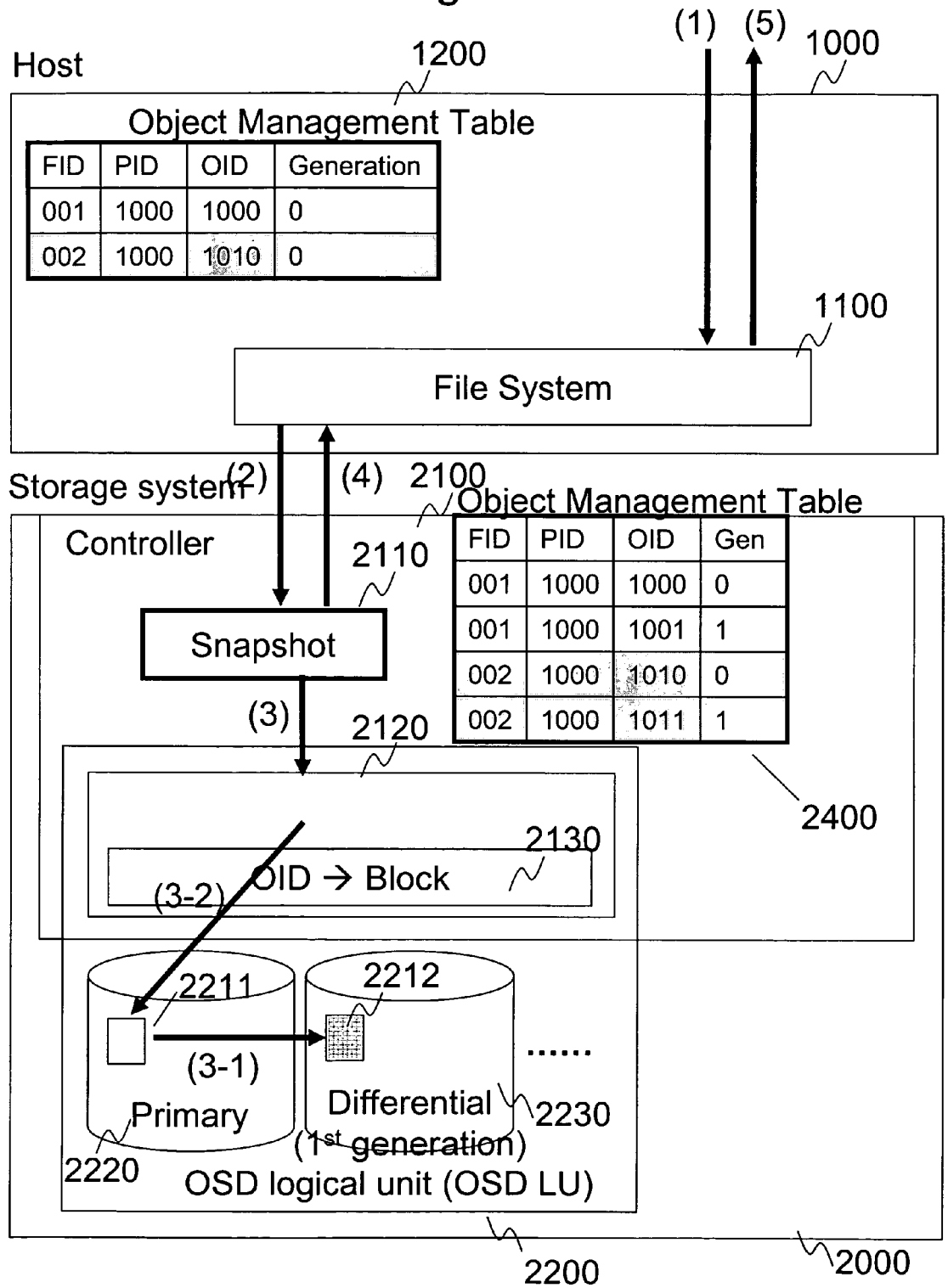
FIG. 18 is a diagram of an object creation process and file write process using primary and differential volumes according to an example embodiment of the present invention.

FIG. 18 shows a diagram of an object creation process and file write process using primary and differential volumes according to an example embodiment of the present invention. In this example embodiment, no metadata server exists, however, it is also possible to use a metadata server that includes an object management table. The object creation process will be discussed followed by the file write process. An object creation process begins when an application on a host 1000 or on a client computer of a host creates a file through a file system API designating a file identifier such as a file name (1). A file system 1100 creates attributes that do not exist in an OSD object 2211 and stores them in a storage device on a host 1000 or on a storage system 2000 as an object by using CREATE AND WRITE command (2). The file system 1100 may manage the creation of partitions, which means the file system 1100 knows in which partition a new object for a file should be created and sets the partition ID (PID) in the CREATE AND WRITE command to specify the partition for a new object. The file system 1100 then issues the CREATE AND WRITE command to create an object for the file.

When the file system issues the CREATE AND WRITE command, it can assign an OID for the file as well as the PID. If the file system sets a number 0, for example, for an OID field of the CREATE AND WRITE command, an OSD may assign the number. A snapshot module 2110 on the disk controller 2100 traps the CREATE AND WRITE command and creates an object which the application requests to create by processing the CREATE AND WRITE command. A service delivery subsystem 2120 receives and executes the CREATE AND WRITE command (3). A primary object 2211 may be created in some unused area of the primary volume 2220 using the designated PID and OID. If the designated OID is 0, for example, the OSD LU 2200 sets an OID. The snapshot module 2110 then returns an OID for the primary object 2211 to the file system (4). The file system 1100 registers the FID, the PID, and the OID of the primary object 2211 into an object management table 1200. A status column in the object management table is not needed now. The generation number for the primary object may be 0, for example, or any other specific number. A file system 1100 returns a result of the file creation operation to an application. Regarding a file creation process, there may be no special operation of the snapshot module needed.

Until getting a snapshot request, the updated object 2212 may be moved to a differential volume 2230. The following process illustrates a file write process. An application on a host 1000 or on a client computer of a host writes data on a file through a file system API, designating a file identifier such as a file name, a data length, and data (1). A file system 1100 searches attributes (e.g., such as an i-node of UNIX systems), and finds a FID for the file. The file system 1100 then searches the PID and OID for the file in an object management table 1200. If the file identifier that is delivered from the application is exactly the same as the FID from the object management table 1200, the search (e.g., of an i-node table) is not needed. The file system 1100 issues a WRITE command to write data to the object for the file with the parameters of a primary PID, a primary OID, a data length, and data (2). A snapshot module 2110 on a disk controller 2100 traps the WRITE command.

The snapshot module then searches the PID and OID for the differential object using the primary PID and OID in an object management table at the storage system 2400. The FID for the primary object is searched using the PID and OID of primary object 2211. The PID and the OID of the differential data are searched using the same FID and the largest generation number. If the differential object 2212 has already been created, then the PID and the OID for the differential object can be found. The snapshot module 2110 moves the primary object 2211 to the differential object 2212 (3) by using the process discussed and shown in FIG. 15 (3-1). If the differential data has not been created yet, the snapshot module 2110 generates the PID and OID for the differential data, and moves the primary object 2211 to the differential object 2212. The snapshot module 2110 writes the data into the primary object (3-2). The snapshot module 2110 may return a result of the operation, such as success or fail, to a file system 1100 (4). Unlike the file creation process, there may be no need to register any information in the object management table 1200. A file system 1100 may return a result of file creation operation to an application (5).

Figure 19:
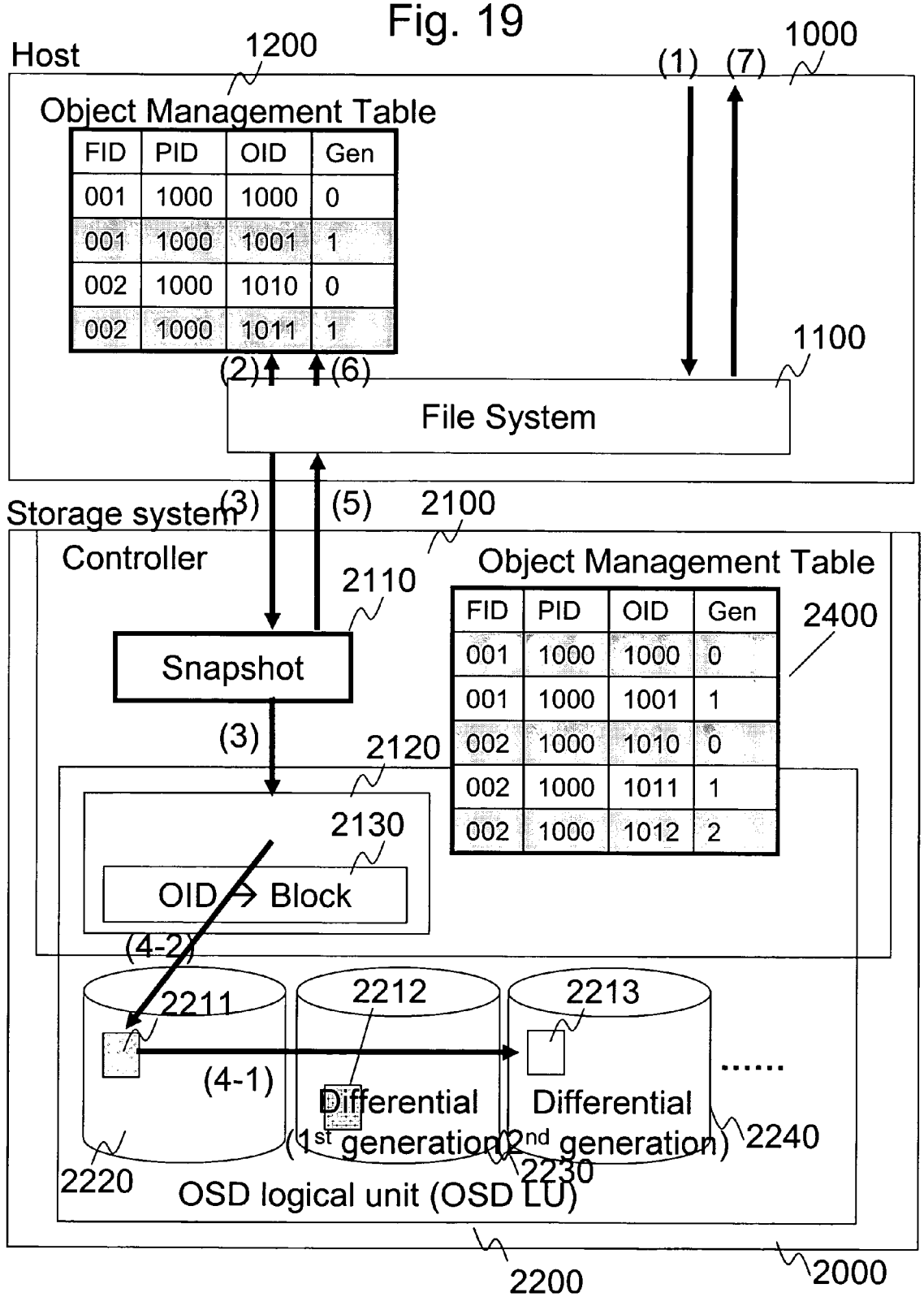
FIG. 19 is a diagram of a next generation of differential data being written into a new differential volume according to an example embodiment of the present invention.

FIG. 19 shows a diagram of a next generation of differential data being written into a new differential volume according to an example embodiment of the present invention. After getting a snapshot command from the users or administrators, the destination of the differential data is changed, i.e., the previous generation of the differential data becomes stable, and a snapshot of the data in time is taken. An application on a host 1000 or on a client computer of a host requests a snapshot creation with a file identifier or a volume name (1). A file system 1100 searches attributes (e.g., such as an i-node of UNIX systems), and finds a FID for the file or volume name. The file system searches for the PID and an OID for the original file in the object management table 1200 (2) using the FID. If the file identifier that is delivered from the application is exactly the same as the FID in the object management table 1200, the attribute search (e.g., of i-node table) is not needed. The file system 1100 can invoke a new OSD command such as a SNAPSHOT command or any existing OSD command with vendor attributes. Furthermore, a proprietary command between the file system 1100 and the snapshot module 2110 can be used.

The file system invokes the snapshot module 2110 in the disk controller 2100 with the parameter of original PID, original OID, or the volume name (3). After receiving the file system request, the snapshot module 2110 changes its configuration (3). As noted previously, the destination of the differential data is changed, thus the previous generation of the differential data becomes stable, and a snapshot 2212 of the data at this time is taken. The next generation of the differential data 2213 is written in the new differential volume 2240 after the next WRITE command (4-1). If the snapshot command (i.e., split) is applied to the whole volume, the other objects in the volume are also split. The snapshot module 2110 sends back both an original OID and PID, a snapshot OID and PID, and a generation number to the file system 1100 (5). The generation number may be managed by the snapshot module 2110. When another snapshot command comes, the generation number is increased by one. The file system 1100 stores the PID, OID and generation number for the snapshot objects in the object management table 1200 (6). The file system 1100 may return a result of file creation operation to the application (7).

Figure 20:
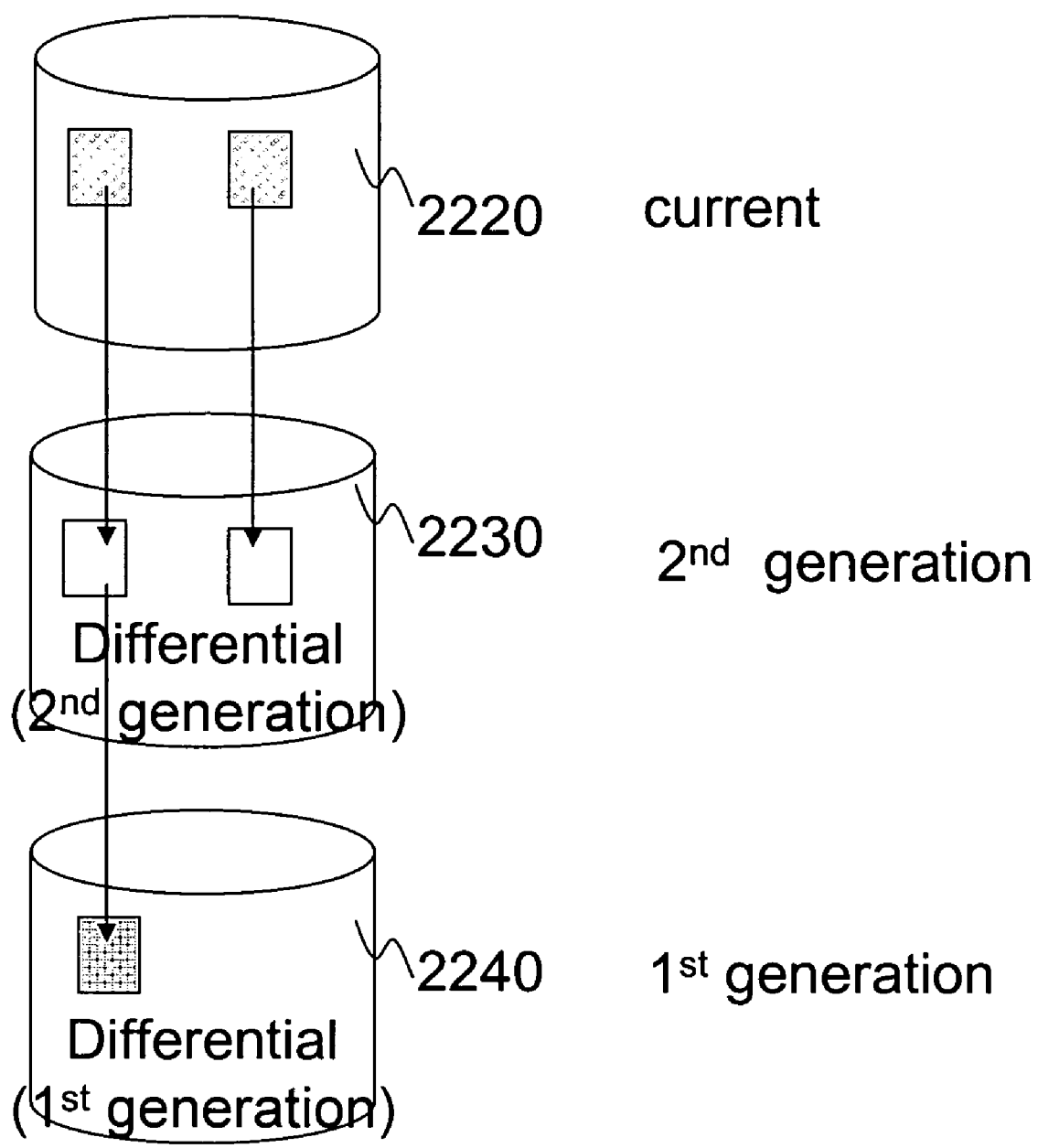
FIG. 20 is a diagram illustrating construction an object by current static data and the sequence of the differential data according to an example embodiment of the present invention.

FIG. 20 shows a diagram illustrating construction an object by current static data and the sequence of the differential data according to an example embodiment of the present invention. Thus far, a way of stopping a snapshot has not been mentioned. This involves a stop snapshot command. When a stop snapshot command us sent from the users or administrators, the copying of data is stopped. The data may be written only onto the primary volume 2220. When the users or administrators want to read some generation of a snapshot, the object may be constructed by current static data and the sequence of the differential data after the designated generation. To read the current data, the data is read from the primary volume 2220. To read the second generation, the current data is read from the primary volume 2220 and also the differential data of the second generation is read from a second generation volume 2230. If the differential data is in the second generation volume 2230, the primary data is overwritten by the second generation data. By doing the same to all objects, the second generation volume 2230 can be read. When the first generation volume 2240 is read, the same process is applied to the second generation data and then the first generation data, and thus the first generation volume 2240 can be read. It may not be possible to create the first generation data by reading the current primary volume 2220 and the first generation data. The second generation data is used because some data might be changed in the second generation volume 2230 but not changed in the first generation volume 2240.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for object-level snapshot creation in an object-based storage system comprising:
    a host device, the host device including a first object management table (OMT) and a file system; and
    an object-based storage system operatively connected to the host device, the storage system including a controller and at least one object-based storage device (OSD) for storing data as objects,
        wherein an object comprises content data and attribute data of the content data, the controller comprising a snapshot module and a second OMT,
        wherein the object-based storage system receives I/O requests from the host device and processes the I/O requests as OSD commands,
        wherein the snapshot module is configured to create a mirror object of an original object in the at least one OSD by:
        reading original content data of the original object;
        getting original attribute data of the original object;
        creating the mirror object using the original content data of the original object and the original attribute data;
        storing the mirror object in a volume separate from said original object; and
        mirroring updates of said original object to said mirror object, and
        wherein said snapshot module is configured to initiate a snapshot operation in the at least one OSD by stopping the mirroring of updates to said mirror object at a specified point in time to create a snapshot of said original object.

2. The system according to claim 1, wherein the snapshot operation comprises creating a second mirror of the original object prior to stopping mirroring of the updates.

3. The system according to claim 1, further comprising a service processor, the service process capable of initiating the OSD commands and SPLIT or SNAPSHOT commands to the snapshot module to initiate the snapshot operation.

4. The system according to claim 1, wherein the first OMT and the second OMT maintain for each object mapping information of a file identifier (FID), a partition ID (PID), and an object ID (OID), and an object status and a generation number of snapshots.

5. The system according to claim 4, wherein the object status comprises one of mirror or split.

6. The system according to claim 1, wherein the disk controller further includes a translation mechanism that translates an OID to a physical block number of the at least one OSD.

7. The system according to claim 1, wherein the at least one OSD further includes a translation mechanism that translates an OID to a physical block number of the at least one OSD.

8. The system according to claim 1, wherein the original object and the mirror object are associated with one of a file, multiple files, a table, a row of a table, a column of a table, a volume, 9. The system according to claim 1, further comprising a metadata server the metadata server operatively connected to the host device, the first OMT residing at the metadata server.

10. A method for pair creation in an object-based storage system comprising:
    storing data to an object-based storage device (OSD) in the object-based storage system, whereby said object-based storage system stores data as objects that include content data and attribute data;
    receiving a PAIR CREATE command in the object-based storage system instructing creation of a mirror pair from one or more original objects in a source volume;
    copying each of said one or more original objects in said a-source volume to a destination volume, in response to receiving the PAIR CREATE command, the copying of each one or more original object comprising:
        determining a new partition ID (PID) and a new object ID (OID) for each copy object;
        reading original content data of the original object;
        retrieving the original attribute data of the original object;

creating the copy object with the retrieved original content data and original attribute data and inserting the new PID and OID into the attribute data of the copy object; and storing each copy object in said destination volume.

11. The method according to claim 10, further comprising registering a file identifier (FID) for each original object and the new PID and new OID for the associated copy object in an object management table (OMT).

12. The method according to claim 10, wherein the PAIR CREATE command is issued from one of an application on a host device, a client device of the host device, or an administrator through a service processor at the object-based storage system.

13. The method according to claim 10, further comprising updating a status column for each said original object and copy object to be "mirror" in the object management table.

14. A method for an object creation in an object-based storage system comprising:

storing data to an object-based storage device (OSD) in the object-based storage system, whereby said object-based storage system stores data as objects that include content data and attribute data;

receiving a file identifier (FID) and data from an application at a file system at a host device;

creating attributes data for a file associated with the file identifier;

creating an original object for the file with the-file content data of the file and the attributes data, the original object having an associated original partition ID (PID) and original object ID (OID);

determining a second PID and a second OID in the OSD for the copy object;

creating a copy object of the original object, said copy object including the file content data and the attribute data of the original object, said second PID and second OID being assigned to said copied object; and registering the FID, original object PID and original object OID in an object management table (OMT).

15. The method according to claim 14, further comprising the original object and the copy object being created at an object-based storage system by a snapshot module at the object-based storage system.

16. The method according to claim 14, further comprising sending a completion status of the object creation to the file system and the application.

17. The method according to claim 14, further comprising assigning the OID and the PID for the object by the file system.

18. The method according to claim 14, further comprising assigning the OID for the object by the object-based storage device at the object-based storage system.

19. A method for writing data to an object in an object-based storage system comprising:

storing data to an object-based storage device (OSD) in the object-based storage system, whereby said object-based storage system stores data as objects that include content data and attribute data;

receiving at a host device a write operation including a file ID (FID) and write data;

searching an object management table at the host device for a partition ID (PID) and object ID (OID) of an object associated with the FID;

sending a write command including the write data, the PID and the OID of the object associated with the FID to a snapshot module at the object-based storage system;

searching an object management table at the storage system using the PID and the OID of the object associated with the FID to determine if the object has a status of mirror or split;

writing the write data to the object if the status is split;

searching the object management table at the storage system for a second PID and a second OID associated with a mirror object using the FID if the status is mirror; and writing the write data to the object and the mirror object if the status is mirror.

20. The method according to claim 19, further comprising identifying the FID by searching attributes in the file system.

21. The method according to claim 19, further comprising sending a completion status of the writing data to the file system and the application.

22. A method for creating a snapshot at an object-based storage system comprising:

storing data to an object-based storage device (OSD) in the object-based storage system, whereby said object-based storage system stores data as objects that include content data and attribute data;

receiving I/O requests at the object-based storage system from a host device and processing the I/O requests as OSD commands;

creating a mirrored object of an original object by:
reading original content data of the original object;
getting original attribute data of the object;
creating the mirrored object using the original content data and the original attribute data of the original objects;
storing the mirrored object in a volume separate from the original object; and
mirroring updates of the original object to the mirrored object, receiving a snapshot request at a host device with an identifier;

searching file attributes at the host device using the identifier to identify a file ID (FID) for the file;

searching an object management table at a host device using the FID to identify a partition ID (PID) and an object ID (OID) for an object associated with the FID, wherein said object associated with the FID is said original object;

receiving a SNAPSHOT command at a snapshot module at the object-based storage system from a file system at the host device;

changing a configuration at the snapshot module to stop mirroring of the object associated with the FID to a the mirrored object that forms a mirror pair with the object associated with the FID, whereby the mirrored object becomes the snapshot; and changing a status in an object management table at the object-based storage system from mirror to split for the mirrored object for which the configuration was changed.

23. The method according to 22, further comprising sending the PID and the OID of the object and a PID and a OID of the mirrored objects and a generation number from the snapshot module to the file system.

24. The method according to 23, further comprising registering the OID and the PID for the mirrored objects and the generation number in the object management table at a host device.

25. The method according to claim 22, further comprising changing a status of the object and the mirrored objects to split at the object management table at the host device.

26. The method according to claim 22, further comprising sending a completion status of the snapshot creation to the file system and an application that initiated the request.

27. The method according to claim 22, further comprising receiving a PAIR CREATE command for the object associated with the FID at the snapshot module, the snapshot module creating another mirror object of the object associated with the FID.

28. The method according to claim 22, further comprising receiving the snapshot request from one of the host device and a service processor at the object-based storage system.

29. The method according to claim 22, wherein the identifier is one of a file identifier or a volume name.

30. A method for creating a snapshot in differential volume at an object-based storage system comprising:
   storing data to an object-based storage device (OSD) in the object-based storage system, whereby the object-based storage system stores data as objects that include content data and attribute data;
   receiving at a host device a snapshot request with an identifier;
   searching file attributes using the identifier to identify a file ID (FID) for a file associated with the identifier;
   searching an object management table at the host device using the FID to identify a partition ID (PID) and an object ID (OID) for a primary object associated with the FID;
   receiving a SNAPSHOT command including the PID and the OID at a snapshot module at the object-based storage system from a file system at the host device;
   changing a configuration at the snapshot module to change a destination of differential data for the primary object to a second differential object from a first differential object having an associated PID and OID;
   taking a point in time snapshot of the first differential object associated with the primary object by stabilizing data at the first differential object:
   increasing a generation number for the primary object by one in a second object management table maintained at said object based storage system; and
   sending the primary object PID and OID, the first differential object PID and OID, and the generation number to the file system.

31. The method according to claim 30, further comprising receiving a volume name in place of the PID and the OID at the snapshot module from the file system.

32. The method according to claim 30, further comprising:
   sending a write command including the PID and the OID of the primary object, a data length and data to the snapshot module at a storage system;
   searching the second object management table at the storage system for the FID for the primary object using the primary object PID and OID;
   searching the second object management table at the storage system using the FID to identify a PID and OID for the second differential object;
   copying the primary object to the second differential object; and
   writing the data to the primary object.

* * * * *